(12) United States Patent
Marsolek et al.

(10) Patent No.: US 10,890,455 B2
(45) Date of Patent: Jan. 12, 2021

(54) SYSTEM AND METHOD FOR DETERMINING HAUL TRUCK ARRIVAL

(71) Applicant: Caterpillar Paving Products Inc., Brooklyn Park, MN (US)

(72) Inventors: John L. Marsolek, Watertown, MN (US); Jacob J. McAlpine, Otsego, MN (US); Dann J. Rawls, Dunlap, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 128 days.

(21) Appl. No.: 16/104,514

(22) Filed: Aug. 17, 2018

(65) Prior Publication Data
US 2020/0056896 A1 Feb. 20, 2020

(51) Int. Cl.
*G01C 21/00* (2006.01)
*G01C 21/34* (2006.01)
*G01C 21/36* (2006.01)

(52) U.S. Cl.
CPC ..... *G01C 21/3407* (2013.01); *G01C 21/3676* (2013.01); *G01C 21/3688* (2013.01)

(58) Field of Classification Search
CPC ............ G01C 21/3407; G01C 21/3676; G01C 21/3688
See application file for complete search history.

(56) References Cited

U.S. PATENT DOCUMENTS

| | | | |
|---|---|---|---|
| 8,930,092 B2 * | 1/2015 | Minich | E01C 23/07 701/50 |
| 9,108,640 B2 | 8/2015 | Jackson | |
| 9,481,964 B1 * | 11/2016 | Marsolek | G08G 1/20 |
| 9,510,137 B2 * | 11/2016 | McCoy | H04L 67/104 |
| 9,611,595 B2 * | 4/2017 | Marsolek | E01C 19/1063 |
| 9,831,980 B2 | 11/2017 | Hayman | |
| 9,836,061 B2 | 12/2017 | Tojima et al. | |
| 9,845,578 B2 * | 12/2017 | Marsolek | H04W 4/029 |
| 10,474,338 B2 * | 11/2019 | Marsolek | G07C 5/0808 |
| 10,480,131 B1 * | 11/2019 | McAlpine | G06Q 50/08 |
| 2012/0143397 A1 * | 6/2012 | Mackay | B60R 25/1025 701/1 |
| 2012/0288328 A1 * | 11/2012 | Minich | E01C 23/07 404/72 |
| 2013/0290062 A1 * | 10/2013 | Patel | G06Q 10/06313 705/7.23 |
| 2014/0133906 A1 * | 5/2014 | Frelich | E01C 19/48 404/75 |
| 2016/0134995 A1 * | 5/2016 | McCoy | H04L 67/104 455/41.2 |

(Continued)

Primary Examiner — Ian Jen
(74) Attorney, Agent, or Firm — Lee & Hayes, PLLC

(57) ABSTRACT

A method includes receiving information associated with a first haul truck configured to traverse a travel path extending from a paving material plant to a worksite. The method also includes identifying the first haul truck as having a location sensor that is one of missing and faulty, determining whether a second haul truck traversed the travel path ahead of the first haul truck, and determining an arrival time at which the first haul truck is expected to arrive at the worksite. In such a method, the arrival time is determined based at least in part on an estimated travel time associated with the first haul truck traversing the travel path, or a recorded travel time associated with the second haul truck traversing the travel path ahead of the first haul truck.

20 Claims, 5 Drawing Sheets

(56) References Cited

U.S. PATENT DOCUMENTS

| | | |
|---|---|---|
| 2016/0259316 A1 | 9/2016 | Ohta et al. |
| 2016/0349753 A1* | 12/2016 | Tojima .................... G01S 19/48 |
| 2017/0053220 A1* | 2/2017 | Marsolek ........... G06Q 10/0637 |
| 2017/0058466 A1* | 3/2017 | Marsolek ................. G08G 1/20 |
| 2017/0058467 A1* | 3/2017 | Marsolek ............ E01C 19/1063 |
| 2017/0060126 A1* | 3/2017 | Marsolek ............. H04W 4/029 |
| 2017/0205814 A1* | 7/2017 | Marsolek ............. G07C 5/0841 |
| 2017/0228108 A1* | 8/2017 | Marsolek ............... G07C 5/008 |
| 2017/0335525 A1* | 11/2017 | Chambers ............... E01C 23/01 |
| 2018/0082591 A1 | 3/2018 | Pandy |

\* cited by examiner

SYSTEM AND METHOD FOR DETERMINING HAUL TRUCK ARRIVAL

TECHNICAL FIELD

The present disclosure relates to a paving system. More specifically, the present disclosure relates to a paving system including a control system configured to determine a time at which a haul truck is expected to arrive at a worksite.

BACKGROUND

Haul trucks, paving machines, compaction machines, and other paving equipment are often used to perform a variety of tasks associated with a worksite. For example, one or more haul trucks may be used to transport paving material from a paving material plant to a worksite so that the paving material can be distributed along a work surface of the worksite by one or more paving machines. One or more compaction machines may follow behind the paving machine, and may be operable to compact the freshly-laid paving material to a desired density or stiffness. The operation of such machines must be coordinated in order to perform paving operations in an efficient manner. In particular, the quality of a mat of paving material deposited by the paving machine may be maximized when the paving machine is controlled to operate without periodic stoppages caused by an inadequate supply of paving material being delivered to the worksite by the one or more haul trucks described above. However, in some situations, it can be difficult to accurately determine an arrival time at which a haul truck is expected to arrive at the worksite. In particular, in situations in which a location sensor associated with a haul truck is missing, faulty, or otherwise inoperable, existing paving systems may not be capable of determining such an arrival time.

An example system for coordinating the activities of paving machines is described in U.S. Patent Application Publication No. 2013/0290062 (hereinafter referred to as the '062 reference). In particular, the '062 reference describes a system for implementing a computer-based method of coordinating activities associated with paving a roadway. The '062 reference describes, for example, a server configured to provide communication among system components. As explained in the '062 reference, the server may receive a communication from a transport truck indicating that a batch of paving material has been delivered to the roadway, and such a communication may be generated automatically by a truck computer system in conjunction with a global positioning system (GPS) receiver on the truck. The '062 reference does not, however, describe determining the arrival time of a haul truck delivering paving material to a worksite. For instance, the '062 reference does not describe determining such an arrival time for a haul truck traveling to the worksite with a missing, faulty, or inoperable location sensor. As a result, paving the machines described in the '062 reference may be caused to stop periodically due to inconsistent delivery of paving material to the worksite. Such stoppages may reduce the consistency and quality of the paving material mat.

Example embodiments of the present disclosure are directed toward overcoming the deficiencies described above.

SUMMARY

In an example embodiment of the present disclosure, a method includes receiving, with a controller, information associated with a first haul truck configured to traverse a travel path extending from a paving material plant to a worksite, the information including a haul truck identifier unique to the first haul truck. The method also includes identifying, with the controller, the first haul truck as having a location sensor that is one of missing and faulty, determining, with the controller, whether a second haul truck traversed the travel path ahead of the first haul truck, and based at least in part on determining whether the second haul truck traversed the travel path ahead of the first haul truck, determining, with the controller, an arrival time at which the first haul truck is expected to arrive at the worksite. In such an example, the arrival time is determined based at least in part on an estimated travel time associated with the first haul truck traversing the travel path, or a recorded travel time associated with the second haul truck traversing the travel path ahead of the first haul truck.

In another example embodiment of the present disclosure, a paving system includes a first haul truck configured to traverse a travel path extending from a paving material plant to a worksite, a second haul truck configured to traverse the travel path, a first location sensor configured to determine a location of the second haul truck along the travel path, and a system controller in communication with the first location sensor via a network. In such examples, the system controller is configured to identify the first haul truck as having a second location sensor that is one of missing and faulty, and determine, based at least in part on a signal received from the first location sensor via the network, that the second haul truck traversed the travel path ahead of the first haul truck. In such examples, the system controller is further configured to determine an arrival time at which the first haul truck is expected to arrive at the worksite, wherein the arrival time is determined based at least in part on a recorded travel time associated with the second haul truck traversing the travel path ahead of the first haul truck.

In yet another example embodiment of the present disclosure, a control system includes a first location sensor, a system controller, and a network configured to transmit signals between the first location sensor and the system controller. In such examples, the system controller is configured to identify a first haul truck as having a second location sensor that is one of missing and faulty, receive a signal from the first location sensor via the network, and determine, based at least in part on the signal, that the second haul truck traversed a travel path ahead of the first haul truck, the travel path extending from a paving material plant to a worksite. In such examples, the system controller is further configured to determine an arrival time at which the first haul truck is expected to arrive at the worksite, wherein the arrival time is determined based at least in part on a recorded travel time associated with the second haul truck traversing the travel path ahead of the first haul truck.

DETAILED DESCRIPTION

Figure 1:
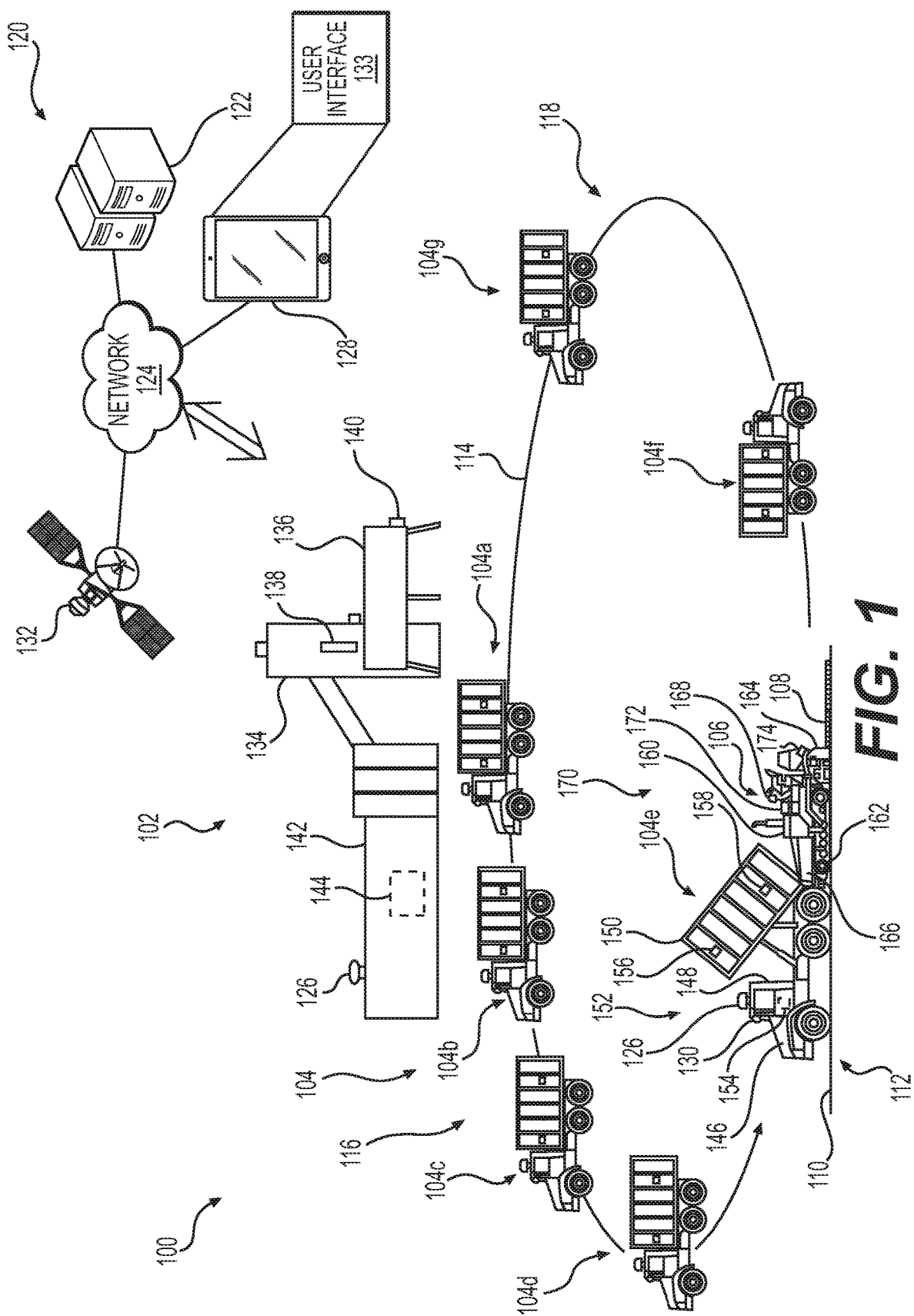
FIG. 1 is a schematic illustration of a paving system in accordance with an example embodiment of the present disclosure.

Wherever possible, the same reference numbers will be used throughout the drawings to refer to the same or like parts. Referring to FIG. 1, an example paving system 100 may include one or more paving material plants 102, and a plurality of machines such as one or more haul trucks 104 and/or one or more paving machines 106. For example, the paving material plant 102 may include various equipment configured to heat, produce, sense, store, and/or transfer paving material 108 such as asphalt. For instance, one or more haul trucks 104 may be loaded with a desired amount of paving material 108 at the paving material plant 102, and the haul trucks may deliver the paving material 108 to the paving machine 106. The paving machine 106 may deposit the paving material 108 onto a work surface 110 of a worksite 112. In any of the examples described here, the one or more haul trucks 104 may be configured to travel along at least one travel path 114 extending from the paving material plant 102 to the worksite 112. Such a travel path 114 may include one or more partially or completely formed roads, highways, bridges, service roads, or other surfaces passable by construction and/or paving machines, and such an example worksite 112 may include, for example, a construction site, a roadworksite, a parking lot, or any other type of job site. Once the one or more haul trucks 104 have delivered the paving material 108 to the worksite 112, the haul trucks 104 may transfer the paving material 108 to a hopper or other component of the paving machine 106, and the paving machine 106 may apply the paving material 108 to and/or otherwise deposit the paving material 108 on the work surface 110 in the form of a substantially flat, substantially smooth paving material mat.

As shown in FIG. 1, an example paving system 100 may include a first haul truck 104a, a second haul truck 104b, a third haul truck 104c, a fourth haul truck 104d, a fifth haul truck 104e, a sixth haul truck 104f, a seventh haul truck 104g (collectively, referred to herein as "haul trucks 104"), and/or one or more additional haul trucks (not shown). In example embodiments, the paving system 100 may include greater than or less than the seven haul trucks 104 shown in FIG. 1. Further, as shown in FIG. 1, the haul trucks 104 may travel sequentially (e.g., one after another), along the travel path 114, from the paving material plant 102 to the worksite 112, and may sequentially return to the paving material plant 102 along substantially the same travel path 114 or along a separate (e.g., different) travel path 114. For example, the haul trucks 104 may deliver paving material 108 to the worksite 112 by sequentially traversing a first portion 116 of the travel path 114 extending from the paving material plant 102 to the worksite 112, and may return to the paving material plant 102 by sequentially traversing a second portion 118 of the travel path 114 extending from the worksite 112 to the paving material plant 102.

Additionally, although not illustrated in FIG. 1, it is understood that the paving system 100 may further include one or more other machines, such as one or more compaction machines and/or one or more remixing transfer vehicles. In such examples, the one or more compaction machines may be configured to compact the mat of paving material 108 to a desired density. It is understood that the consistency, density, and/or quality of the mat of paving material may be maximized when the paving machine 106 is controlled to operate without stopping. Accordingly, in order to avoid paving machine stoppages, embodiments of the present disclosure may be used to determine an arrival time at which an example haul truck 104a is expected to arrive at the worksite 112. In some examples, the arrival time of the haul truck 104a may be determined based on a variety of factors and/or information. For instance, the arrival time of the haul truck 104d may be determined based at least in part on an estimated travel time associated with the haul truck 104d traversing the travel path 114 from the paving material plant 102 to the worksite 112. In other examples, the arrival time of the haul truck 104d may be determined based at least in part on an actual, previous, recorded, and/or otherwise known travel time associated with another of the haul trucks 104 (e.g., the haul truck 104e shown in FIG. 1) traversing the travel path 114 from the paving material plant 102 to the worksite 112 ahead of the haul truck 104d. In still further examples, the arrival time of the haul truck 104d may be determined based at least in part on an average travel time associated with two or more of the haul trucks 104 traversing the travel path 114 from the paving material plant 102 to the worksite 112 ahead of the haul truck 104d. In any of the examples described herein, the arrival time of the haul truck 104d may be determined on a substantially continuous basis and in substantially real time. Determining the arrival time of a haul truck 104d in this way may be useful in situations in which, for example, the haul truck 104d includes a location sensor that is missing (e.g., that is not located on or in the haul truck 104d while the haul truck 104d is disposed at the paving material plant 102) or that is faulty (e.g., that is malfunctioning, out of power, disconnected from a network, unable to connect to one or more location satellites, and/or otherwise inoperable). In such examples, the determined arrival time at which the haul truck 104d is expected to arrive at the worksite 112 may be used to control the speed, paving rate, and/or other operations of the paving machine 106. For instance, the determined arrival time may be used to reduce the speed and/or paving rate of the paving machine 106 in examples in which the determined arrival time indicates the haul truck 104d is behind schedule and/or will otherwise be delayed in arriving at the worksite 112. As a result, the determined arrival time of the haul truck 104d may be used to avoid stoppages of the paving machine 106. Thus, the determined arrival time may be used to maximize the quality of the mat of paving material 108, thereby improving the overall efficiency of the paving system 100.

In example embodiments, the paving material plant 102 may produce paving material 108 such as asphalt from bitumen, aggregate, and other materials or fillers. The paving material 108 is often produced in batches with each batch stored or held in a separate storage or holding location, such as a silo, until it is loaded into one or more haul trucks 104 at a loading station. Each holding location may be dedicated to storing or holding paving material 108 for a particular worksite 112 and paving material 108 within a particular holding location is periodically loaded into one or more haul trucks 104 for transport to the worksite 112. The characteristics of each batch stored within a holding location may be set based upon the desired characteristics for a particular paving job. For example, the amount of oil and the size of the aggregate may be set based upon the desired characteristics of the paving material 108 and the requirements of each paving job. Each batch of paving material 108 may be periodically or continuously mixed at the holding location and maintained at a desired temperature. The temperature at which the paving material 108 is maintained may be set based upon a desired temperature at which the paving material 108 will be loaded into the haul trucks 104. Such loading temperature may be based upon the desired temperature at which the load will be delivered to the paving machine 106, the ambient temperature of the air, the expected time required for the haul trucks 104 to drive from the paving material plant 102 to the worksite 112 (e.g., to the paving machine 106), as well as any expected or anticipated waiting time for the haul trucks 104 at the worksite 112.

The paving system 100 shown in FIG. 1 may also include a control system 120 and one or more system controllers 122. In some examples, the control system 120 and/or the system controller 122 may be located at the paving material plant 102. In such examples, the control system 120 and/or the system controller 122 may also include components located remotely from the paving material plant 102 such as on any of the machines of the paving system 100, at the worksite 112, and/or at a remote command center (not shown). In other examples, the control system 120 and/or the system controller 122 may be located remote from the paving material plant 102 and/or remoter from the worksite 112, such as at the remoter command center referred to above. In any of the examples described herein, the functionality of the system controller 122 may be distributed so that certain operations are performed at the paving material plant 102 and other operations are performed remotely. For example, some operations of the system controller 122 may be performed at the worksite 112, on one or more of the haul trucks 104, on one or more of the paving machines 106, etc. It is understood that the system controller 122 may comprise a component of the paving system 100, the paving material plant 102, one or more of the haul trucks 104, one or more of the paving machines 106, a component of a separate mobile device (e.g., a mobile phone, a tablet, a laptop computer, etc.), and/or the control system 120.

The system controller 122 may be an electronic controller that operates in a logical fashion to perform operations, execute control algorithms, store and retrieve data and other desired operations. The system controller 122 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the system controller 122 such as power supply circuitry, signal conditioning circuitry, driver circuitry, and other types of circuitry.

The system controller 122 may be a single controller or may include more than one controller (such as additional controllers associated with each of the haul trucks 104, paving machines 106, compaction machines (not shown), and/or other machines of the paving system 100) configured to control various functions and/or features of the paving system 100. As used herein, the term "controller" is meant in its broadest sense to include one or more controllers, processors, central processing units, and/or microprocessors that may be associated with the paving system 100, and that may cooperate in controlling various functions and operations of the paving material plant 102 and the machines of the paving system 100. The functionality of the system controller 122 may be implemented in hardware and/or software without regard to the functionality. The system controller 122 may rely on one or more data maps, look-up tables, neural networks, algorithms, machine learning algorithms, and/or other components relating to the operating conditions and the operating environment of the paving system 100 that may be stored in the memory of the system controller 122. Each of the data maps noted above may include a collection of data in the form of tables, graphs, and/or equations to maximize the performance and efficiency of the paving system 100 and its operation.

The components of the control system 120 may be in communication with and/or otherwise operably connected to any of the components of the paving system 100 via a network 124. The network 124 may be a local area network ("LAN"), a larger network such as a wide area network ("WAN"), or a collection of networks, such as the Internet. Protocols for network communication, such as TCP/IP, may be used to implement the network 124. Although embodiments are described herein as using a network 124 such as the Internet, other distribution techniques may be implemented that transmit information via memory cards, flash memory, or other portable memory devices.

It is also understood that the paving material plant 102, the various haul trucks 104, paving machines 106, compaction machines (not shown) and/or other components of the paving system 100 may include respective controllers, and each of the respective controllers may be in communication and/or may otherwise be operably connected via the network 124. For example, the network 124 may comprise a component of a wireless communication system of the paving system 100, and as part of such a wireless communication system, the paving material plant 102, the one or more haul trucks 104, the paving machine 106, the one or more compaction machines and/or other components of the paving system 100 may include respective communication devices 126. Such communication devices 126 may be configured to permit wireless transmission of a plurality of signals, instructions, and/or information between the paving material plant 102, the haul trucks 104, the paving machines 106, the compaction machines, and the system controller 122, as well as to permit communication with other machines and systems remote from the paving material plant 102, haul trucks 104, paving machines 106, and/or the worksite 112. For example, such communication devices 126 may include a transmitter configured to transmit signals to a receiver of one or more other such communication devices 126. In such examples, each communication device 126 may also include a receiver configured to receive such signals. In some examples, the transmitter and the receiver of a particular communication device 126 may be combined as a transceiver or other such component. In any of the examples described herein, such communication devices 126 may also enable communication with one or more tablets, computers, cellular/wireless telephones, personal digital assistants, mobile devices, or other electronic devices 128 located at the worksite 112, at the paving material plant 102, and/or remote from the worksite 112 or the paving material plant 102. Such electronic devices 128 may comprise, for example, mobile phones and/or tablets of project managers (e.g., foremen) overseeing daily paving operations at the worksite 112 and/or at the paving material plant 102.

The network 124, communication devices 126, and/or other components of the wireless communication system described above may implement or utilize any desired system or protocol including any of a plurality of communications standards. The desired protocols will permit communication between the system controller 122, one or more of the communication devices 126, and/or any other desired machines or components of the paving system 100. Examples of wireless communications systems or protocols that may be used by the paving system 100 described herein include a wireless personal area network such as Bluetooth® (e.g., IEEE 802.15), a local area network such as IEEE 802.11b or 802.11g, a cellular network, or any other system or protocol for data transfer. Other wireless communication systems and configurations are contemplated. In some instances, wireless communications may be transmitted and received directly between the control system 120 and a machine (e.g., a paving machine 106, a haul truck 104, etc.) of the paving system 100 or between such machines. In other instances, the communications may be automatically routed without the need for re-transmission by remote personnel.

In example embodiments, one or more machines of the paving system 100 (e.g., the one or more haul trucks 104, the paving machine 106, etc.) may include a location sensor 130 configured to determine a location and/or orientation of the respective machine. In such embodiments, the communication device 126 of the respective machine may be configured to generate and/or transmit signals indicative of such determined locations and/or orientations to, for example, the system controller 122 and/or to the other respective machines of the paving system 100. In some examples, the location sensors 130 of the respective machines may include and/or comprise a component of global navigation satellite system (GNSS) or a global positioning system (GPS). Alternatively, universal total stations (UTS) may be utilized to locate respective positions of the machines. In example embodiments, one or more of the location sensors 130 described herein may comprise a GPS receiver, transmitter, transceiver, laser prisms, and/or other such device, and the location sensor 130 may be in communication with one or more GPS satellites 132 and/or UTS to determine a respective location of the machine to which the location sensor 130 is connected continuously, substantially continuously, or at various time intervals. One or more additional machines of the paving system 100 may also be in communication with the one or more GPS satellites 132 and/or UTS, and such GPS satellites 132 and/or UTS may also be configured to determine respective locations of such additional machines. In any of the examples described herein, machine locations determined by the respective location sensors 130 may be used by the system controller 122 and/or other components of the paving system 100 to coordinate activities of the haul trucks 104, paving machine 106, and/or other components of the paving system 100. For example, machine locations determined by the respective location sensors 130 may be used by the system controller 122 and/or other components of the paving system 100 to determine delivery rates of paving material 108 being delivered to the worksite 112 from the paving material plant 102. For instance, such machine locations may be used by the system controller 122 and/or other components of the paving system 100 to determine an arrival time at which one or more of the haul trucks 104 (e.g., the haul truck 104d) is expected to arrive at the worksite 112. Such an arrival time may be useful to minimize and/or avoid stoppages of the paving machine 106 caused by, for example, an inadequate supply of paving material 108 being delivered to the worksite 112. For instance, as will be described in greater detail below, in some examples the system controller 122 and/or other components of the paving system 100 determine such an arrival time associated with a haul truck 104d having a location sensor 130 that is missing or faulty. The system controller 122 and/or other components of the paving system 100 may also generate a user interface 133 that includes, among other things, information indicative of the arrival time associated with the haul truck 104d. The system controller 122 may provide the user interface 133 to, for example, the electronic device 128, a controller of the paving machine 106, and/or other components of the paving system 100, via the network 124, for display such that operation of the various components of the paving system 100 can be modified and/or otherwise controlled based at least in part the determined arrival time. In examples in which the paving machine 106, compaction machines, and/or other components of the paving system 100 are operating under autonomous or semi-autonomous control, the speed, steering, paving rate, and/or other functions of such components may be controlled automatically or semi-automatically based at least in part on the determined arrival time.

With continued reference to FIG. 1, the paving material plant 102 may include various material delivery components, mixers, heaters, and/or other equipment configured to assist in manufacturing paving material 108 for use in various paving operations. Such equipment may include, for example, one or more conveyors or other devices configured to transport paving material 108 to one or more paving material silos 134 or other holding locations for storage therein. The paving material plant 102 may also include one or more load stations 136 configured to transfer paving material 108 from the one or more paving material silos 134 to the one or more haul trucks 104. In such examples, a paving material silo 134 may include one or more sensors 138 configured to determine a temperature of paving material 108 stored within the paving material silo 134 and/or an amount of paving material 108 stored within the paving material silo 134 (e.g., a fill level of the paving material silo 134). Similarly, the load station 136 may include one or more sensors 140 configured to determine the presence and/or location of one or more haul trucks 104 (e.g., the haul truck 104a shown in FIG. 1), a time at which the haul truck 104a arrived at the load station 136, a time at which the haul truck 104a departed the load station 136, an amount (e.g., a weight) of paving material 108 loaded into the haul truck 104a, and/or other information associated with the haul truck 104a. In some examples, the sensor 140 may comprise a scale or other mass sensor configured to determine the weight of the haul truck 104a upon entering the load station 136, the weight of the haul truck 104a after paving material has been loaded into the haul truck 104a, and/or a change in weight of the haul truck 104a.

The paving material plant 102 may also include one or more scale houses, operator stations, or other stations 142 for use by paving material plant personnel. For example, as shown in phantom in FIG. 1, one or more such stations 142 may include a paving material plant controller 144 that is substantially similar to and/or the same as the system controller 122 described above. In some examples, the paving material plant controller 144 may comprise a component of the control system 120. In any of the examples described herein, the paving material plant controller 144 and/or other components of the paving material plant 102 may be configured to monitor, record, and/or communicate activities of the various haul trucks 104 entering and leaving the paving material plant 102. For example, the various sensors of the paving material plant 102 and/or the paving material plant controller 144 may monitor, sense, determine, record, and/or transmit information indicative of a time at which a particular haul truck 104a enters the paving material plant 102, a time at which the haul truck 104a leaves the paving material plant 102, the amount of paving material 108 loaded into the particular departing haul truck 104a, the destination of the particular haul truck 104a (e.g., the location of the worksite 112) the operator of the haul truck 104*a*, and/or other information. Such information may be used by, for example, the system controller 122 in any of the arrival time determinations and/or other operations described herein.

In some examples, further information associated with a haul truck 104*a* may be collected while the particular haul truck 104*a* is disposed at the paving material plant 102. For instance, each of the haul trucks 104 may have a unique license plate number, a unique truck identification number, a radio frequency identification (RFID) tag, and/or other haul truck identifier that is unique to the respective haul truck 104*a*. In such examples, a haul truck identifier unique to the respective haul truck 104*a* may be scanned, observed, and/or otherwise determined by the sensor 140 while the haul truck 104*a* is disposed at the load station 136. Additionally or alternatively, the haul truck identifier unique to the respective haul truck 104*a* may be scanned, observed, and/or otherwise determined by one or more sensors (not shown) associated with the station 142 when the haul truck 104*a* is disposed at the station 142. Additionally or alternatively, paving material plant personnel may scan, observe, and/or otherwise determine the haul truck identifier unique to the respective haul truck 104*a* using one or more hand-held scanners, sensors, or other devices when the haul truck 104*a* is disposed at the load station 136, the station 142, and/or at other locations within the paving material plant 102. In any such examples, the sensors, hand-held scanners, or other devices described above may provide the determined haul truck identifier to the paving material plant controller 144, together with a time stamp indicating the time at which the haul truck identifier was determined, in one or more signals transmitted via the network 124.

As noted above, the haul trucks 104 of the paving system 100 may be operable to transport paving material 108 between the paving material plant 102 and one or more of the paving machines 106 located at the worksite 112. Each of the haul trucks 104 may include a chassis 146 that supports a prime mover, such as an engine, and a cab 148 in which an operator may be positioned to provide input instructions to operate the haul truck 104. The engine is operatively connected to and drives a ground engaging drive mechanism such as wheels. A material transport unit such as a dump body 150 is pivotally mounted on the chassis 146 and receives a payload (e.g., paving material 108) to be hauled from one location to another.

Each of the haul trucks 104 may include a truck control system 152 and a truck controller 154 generally similar or identical to the control system 120 and the system controller 122, respectively. The truck control system 152 and the truck controller 154 may be located on a respective one of the haul trucks 104 and may also include components located remotely from the respective one of the haul trucks 104 such as on any of the other machines of the paving system 100, at the paving material plant 102, or at a command center (not shown). The functionality of truck controller 154 may be distributed so that certain functions are performed on the respective one of the haul trucks 104 and other functions are performed remotely. In some examples, the truck control system 152 and/or the truck controller 154 may enable autonomous and/or semi-autonomous control of the respective one of the haul trucks 104.

The haul truck 104 may also be equipped with a plurality sensors connected to and/or otherwise in communication with the truck controller 154 and/or with the system controller 122. Such sensors may be configured to provide data indicative (directly or indirectly) of various operating parameters of the respective one of the haul trucks 104, systems associated with the respective one of the haul trucks 104, and/or the worksite 112 and/or other environment in which the respective one of the haul trucks 104 is operating. In any of the examples described herein, such sensors may comprise components of the truck control system 152, the control system 120, and/or the paving system 100, generally. For example, as noted above, each of the haul trucks 104 may be equipped with a location sensor 130 configured to sense, detect, and/or otherwise determine a location and/or orientation of a respective one of the haul trucks 104. The location sensor 130 may include a plurality of individual sensors that cooperate to generate and provide location signals to the truck controller 154 and/or to the system controller 122 indicative of the location and/or orientation of a respective one of the haul trucks 104. In some examples, the location sensor 130 may be fixed to the cab 148, the chassis 146, and/or any other component of the haul truck 104. In other examples, however, the location sensor 130 may be removably attached to a respective one of the haul trucks 104 and/or disposed within, for example, the cab 148 of a haul truck 104*a* during operation of the haul truck 104*a*. As noted above, and as will be described below, in some examples one or more of the haul trucks 104 (e.g., the haul truck 104*d*) may have a location sensor 130 that is missing or that is faulty. In such examples, the system controller 122, the paving material plant controller 144, the truck controller 154, and/or other components of the control system 120 may identify the particular haul truck 104*d* as having a location sensor 130 that is one of missing and faulty. For instance, in such examples the system controller 122 and/or other components of the control system 120 may identify the haul truck 104*d* as having a location sensor 130 that is one of missing and faulty based at least in part on determining, without receiving a signal from the location sensor 130 while the haul truck 104*d* is disposed at the paving material plant 102, that the haul truck 104*d* is disposed at the paving material plant 102. In such examples, the system controller 122 may determine that the haul truck 104*d* is disposed at the paving material plant 102 based on one or more signals received from the sensor 140 while the haul truck 104*d* is disposed at the load station 136, a sensor (not shown) associated with the station 142, one or more signals received from a hand-held scanner, sensors, or other device of paving plant personnel, and/or other signals received from various other paving material plant sensors (e.g., proximity sensors, geofences/geofence sensors, location sensors, etc.) when the haul truck 104*d* is disposed at the load station 136, the station 142, and/or at other locations within the paving material plant 102.

In some examples, each of the haul trucks 104 may also include a load sensor 156 configured to sense, measure, and/or otherwise determine the load or amount of paving material 108 disposed within the dump body 150. The haul trucks 104 may further include a temperature sensor 158 configured to sense, measure, and/or otherwise determine the temperature of the load (e.g., paving material 108) within the dump body 150.

With continued reference to FIG. 1, the paving machine 106 may include a frame 160 having a set of ground engaging wheels or tracks 162 mounted thereto, as well as a screed 164 for spreading paving material 108 across a width of the work surface 110. The paving machine 106 may further include a hopper 166 for storing paving material 108 supplied by the haul trucks 104 or another supply machine, and a conveyor system which transfers paving material 108 from the hopper 166 to the screed 164. The paving machine 106 may further include an operator console having a display 168, such as an LCD display. The display 168 may be mounted to the frame 160 for viewing by an operator. In an example embodiment, the display 168 may be configured to display the user interface 133 described above. As will be described below, an example user interface 133 may include, among other things, visual indicia of the paving material plant 102, visual indicia of the worksite 112, and/or identifiers associated with one or more of the respective haul trucks 104. An example user interface 133 may, additionally or alternatively, include information indicative of an arrival time of one or more of the haul trucks 104. For example, the user interface 133 may provide an indication of the time remaining (hours, minutes, seconds, etc.) until a next one of the haul trucks 104 is expected to arrive at the worksite 112. In other examples, the user interface 133 may provide an indication of the time of day (e.g., 10:32 am) at which a next one of the haul trucks 104 is expected to arrive at the worksite 112.

In still further examples, the user interface 133 may include a map of the worksite 112 including icons or other visual indicia representing the work surface 110, the paving machine 106, one or more of the haul trucks 104, and/or other components of the paving system 100. The user interface 133 may also include a map of the area surrounding the worksite 112. For instance, such a map may include lines, icons, markers, or other visual indicia representing the paving material plant 102, the worksite 112, the travel path 114 extending from the paving material plant 102 to the worksite 112, one or more of the haul trucks 104 disposed on the travel path 114, one or more additional roads, or other items. In additional examples, the user interface 133 may include information associated with a respective one of the haul trucks 104, paving material information, and/or other information typically included in a paving ticket generated at the paving material plant 102. Further, it is understood that such user interfaces 133 may be displayed via the display 168, the electronic device 128, and/or via any other displays associated with the system controller 122, the paving material plant controller 144, or other components of the control system 120.

The paving machine 106 may also include a paving machine control system 170 and a paving machine controller 172 generally similar or identical to the control system 120 and the system controller 122, respectively. The paving machine control system 170 and the paving machine controller 172 may be located on the paving machine 106 and may also include components located remotely from the paving machine 106 such as on any of the other machines of the paving system 100, at the paving material plant 102, or at a command center (not shown). The functionality of paving machine controller 172 may be distributed so that certain functions are performed on the paving machine 106 and other functions are performed remotely. In some examples, the paving machine control system 170 and/or the paving machine controller 172 may enable autonomous and/or semi-autonomous control of the paving machine 106. For example, the paving machine controller 172 may be configured to receive one or more haul truck arrival times from the system controller 122. In an autonomous or semi-autonomous mode of operation, the paving machine controller 172 and/or the paving machine control system 170, generally, may be operable to cause the paving machine 106 to travel at a desired paving machine speed while depositing paving material 108 on the work surface 110 based at least in part on the received arrival time. Such operation and/or control of the paving machine 106 may minimize and/or eliminate paving machine stoppages.

The paving machine 106 may also be equipped with a plurality sensors connected to and/or otherwise in communication with the paving machine controller 172 and/or with the system controller 122. Such sensors may be configured to provide data indicative (directly or indirectly) of various operating parameters of the paving machine 106, systems associated with the paving machine 106, and/or the worksite 112, and/or other environments in which the paving machine 106 is operating. In any of the examples described herein, such sensors may comprise components of the paving machine control system 170, the control system 120, and/or the paving system 100, generally. For example, in addition to the location sensor 130 and communication device 126 described above, the paving machine 106 may also include a temperature sensor 174 mounted, for example, on or proximate the screed 164. The temperature sensor 174 may be positioned and/or otherwise configured to determine the temperature of the mat of paving material 108 deposited on the work surface 110 by the screed 164. In some examples, the temperature sensor 174 may comprise an optical temperature sensor such as an infrared camera, whereas in other embodiments the temperature sensor 174 may comprise a non-optical sensor such as a digital or analog thermometer. While the temperature sensor 174 is shown mounted on the screed 164 such that it can determine the temperature of paving material 108 deposited on the work surface 110 and located behind the screed 164 as paving progresses, the present disclosure is not limited to this configuration. For example, in other embodiments the temperature sensor 174 may be mounted at a different location on the paving machine 106, and may be configured to sense paving material temperature within paving machine 106.

Figure 2:
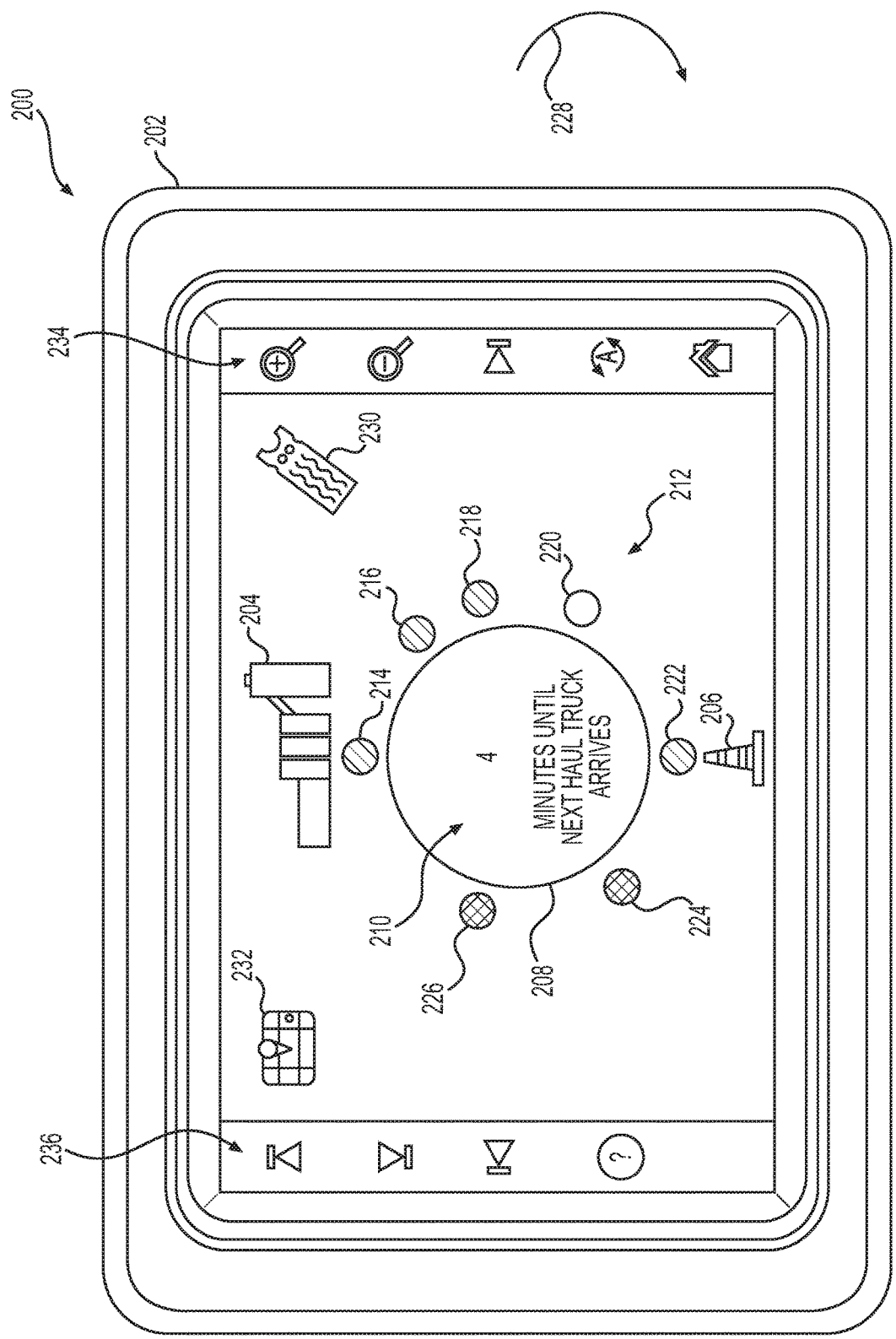
FIG. 2 is an illustration of an example user interface generated by a controller of the paving system shown in FIG. 1.

FIG. 2 illustrates an example user interface 200 of the present disclosure. The example user interface 200 may comprise any of the user interfaces 133 described above with respect to FIG. 1, and the user interface 200 of FIG. 2 is shown as being displayed on an LCD display, a CRT display, a touch-screen (e.g., a capacitive/touch-sensitive) display device, and/or other display 202. In some examples, the display 202 may comprise a display of the electronic device 128, a display associated with the system controller 122, a display associated with the paving material plant controller 144, and/or a display associated with one or more other components of the control system 120. In further examples, the display 202 may comprise a display of the paving machine 106 that is similar to and/or the same as the display 168 described above with respect to FIG. 1.

As shown in FIG. 2, an example user interface 200 may include images, icons, and/or other visual indicia associated with the paving material plant 102, the worksite 112, one or more of the haul trucks 104, and/or other components of the paving system 100. For example, the user interface 200 may include visual indicia 204 associated with, resembling, and/or otherwise indicative of the paving material plant 102, and visual indicia 206 associated with, resembling, and/or otherwise indicative of the worksite 112. In some examples, the layout, arrangement, visual indicia, and/or other configurations of the user interface 200 may in some ways resemble the physical locations of the one or more components of the paving system 100 illustrated therein. For example, the visual indicia 204 of the paving material plant 102 may be disposed in a first portion of the user interface 200, and the visual indicia 206 of the worksite 112 may be disposed in a second portion of the user interface 200 that is spaced from, and/or otherwise separated from the first portion of the user interface 200. Such spacing and/or separation may be indicative of the physical and/or geographic distance between the paving material plant 102 and the worksite 112. In some examples, the user interface 200 may also include one or more lines, images, icons, and/or other visual indicia (not shown) resembling and/or otherwise indicative of the travel path 114 extending from the paving material plant 102 and the worksite 112. In some examples, the user interface 200 may include one or more lines, arrows, bars, and/or other visual indicia indicative of the portion 116 of the travel path 114 extending from the paving material plant 102 to the worksite 112, and the user interface 200 may also include one or more similar lines, arrows, bars, and/or other visual indicia indicative of the portion 118 of the travel path 114 extending from the worksite 112 to the paving material plant 102. In such examples, the length, shape, orientation, location on the user interface 200, and/or other configurations of such visual indicia may be indicative of the contours, distances, and/or other physical, and/or geographic configurations of the travel path 114.

The user interface 200 may also include at least one section, portion, windows 208, and/or other component configured to provide information 210 associated with operations at the worksite 112, operations at the paving material plant 102, and/or any other information associated with various components of the paving system 100. For example, in any of the embodiments described herein, the user interface 200 may provide and/or otherwise include information 210 indicative of an arrival time at which at least one of the haul trucks 104 is expected to arrive at the worksite 112. As shown in FIG. 2, in some examples the user interface 200 may provide information 210 indicating the time remaining (hours, minutes, seconds, etc.) until a next one of the haul trucks 104 is expected to arrive at the worksite 112. In other examples, the user interface 200 may provide information 210 indicating the time of day at which a next one of the haul trucks 104 is expected to arrive at the worksite 112. In still further examples, such information 210 may be provided by the user interface 200 in any other additional ways or configurations.

In some examples, the user interface 200 may also include one or more lines, dots, images, icons, and/or other visual indicia 212 resembling and/or otherwise indicative of one or more of the haul trucks 104 associated with the paving system 100. For example, as shown in FIG. 2 and with reference to the example paving system 100 described above with respect to FIG. 1, the visual indicia 212 included in the user interface 200 may include, among other things, an identifier 214 associated with, corresponding to, and/or otherwise indicative of the haul truck 104a disposed at the paving material plant 102, an identifier 216 associated with, corresponding to, and/or otherwise indicative of the haul truck 104b traversing the portion 116 of the travel path 114 ahead of the haul truck 104a, an identifier 218 associated with, corresponding to, and/or otherwise indicative of the haul truck 104c traversing the portion 116 of the travel path 114 ahead of the haul truck 104b, an identifier 220 associated with, corresponding to, and/or otherwise indicative of the haul truck 104d traversing the portion 116 of the travel path 114 ahead of the haul truck 104c, and an identifier 222 associated with, corresponding to, and/or otherwise indicative of the haul truck 104e disposed at the worksite 112. In such examples, the visual indicia 212 may be associated with, correspond to, and/or may otherwise be indicative of a plurality of haul trucks 104 traveling sequentially (e.g., in series, one after another) from the paving material plant 102 to the worksite 112 along the portion 116 of the travel path 114.

As shown in FIG. 2 and with reference to the example paving system 100 described above with respect to FIG. 1, the visual indicia 212 included in the user interface 200 may also include, among other things, an identifier 224 associated with, corresponding to, and/or otherwise indicative of the haul truck 104f traversing the portion 118 of the travel path 114 ahead of the haul truck 104e (e.g., returning to the paving material plant 102 from the worksite 112), and an identifier 226 associated with, corresponding to, and/or otherwise indicative of the haul truck 104g traversing the portion 118 of the travel path 114 ahead of the haul truck 104f. While the visual indicia 212 illustrated in FIG. 2 are shown as dots, circles, and/or other icons, in additional examples, such visual indicia 212 may be shaped, sized, and/or otherwise configured to resemble the corresponding haul trucks 104. Additionally, in any of the examples described herein, each of the visual indicia 212 included in the user interface 200 may be shaped, sized, colored, patterns, shaded, hatched, positioned, and/or otherwise configured to provide additional information associated with a corresponding one of the haul trucks 104. For example, each of the identifiers 214, 216, 218, 222 may be colored, patterned, shaded, hatched, and/or otherwise displayed with a first configuration (e.g., shown as a first hatched pattern in FIG. 2) to indicate that haul trucks 104 corresponding to each of the respective identifiers 214, 216, 218, 222 are currently loaded with paving material 108. Similarly, each of the identifiers 224, 226 may be colored, patterned, shaded, hatched, and/or otherwise displayed with a second configuration (e.g., shown as a second hatched pattern in FIG. 2 different from the first hatched pattern) to indicate that haul trucks 104 corresponding to each of the respective identifiers 224, 226 are currently not loaded with paving material 108. It is also understood that the identifier 220 may be colored, patterned, shaded, hatched, and/or otherwise displayed with a third configuration (e.g., shown without a hatched pattern in FIG. 2) to indicate that the haul truck 104d corresponding to the identifier 220 includes a location sensor 130 that is one of missing and faulty.

In such examples, the identifier 220 may also be displayed with one or more additional colors, patterns, shades, hatchings, and/or other configurations to indicate whether the haul truck 104d corresponding to the identifier 220 is currently loaded with paving material 108 or whether the haul truck 104d is currently not loaded with paving material 108. Similarly, in such examples the identifiers 214, 216, 218, 222, 224, 226 may be displayed with one or more additional colors, patterns, shades, hatchings, and/or other configurations to indicate whether the respective haul trucks 104 corresponding to the identifiers 214, 216, 218, 222, 224, 226 include a functional location sensor 130.

Moreover, in some examples, the position, orientation, and/or other configurations of the visual indicia 212 may be representative of, associated with, and/or otherwise indicative of the locations of the respective haul trucks 104. For example, in some embodiments, the identifiers 214, 216, 218, 220, 222 may be positioned on the user interface 200, at locations between the visual indicia 204 and the visual indicia 206, indicative of substantially real-time locations of the respective haul trucks 104 corresponding to the identifiers 214, 216, 218, 220, 222. Such substantially real-time locations of the respective haul trucks 104 may comprise, for example, locations of the respective haul trucks 104 along the portion 116 of the travel path 114 extending from the paving material plant 102 to the worksite 112. Similarly, the identifiers 224, 226 may be positioned on the user interface 200, at locations between the visual indicia 206 and the visual indicia 204, indicative of substantially real-time locations of the haul trucks 104*f,* 104*g* corresponding to the identifiers 224, 226, respectively. Such substantially real-time locations of the haul trucks 104*f,* 104*g* may comprise, for example, locations of the haul trucks 104*f,* 104*g* along the portion 118 of the travel path 114 extending from the worksite 112 to the paving material plant 102.

In still further, example embodiments, the position, orientation, and/or other configurations of the visual indicia 212 may be representative of, associated with, and/or otherwise indicative of the determined arrival times of the respective haul trucks 104. For example, in some embodiments, the identifiers 214, 216, 218, 220, 222 may be positioned on the user interface 200, at locations between the visual indicia 204 and the visual indicia 206, indicative of determined arrival times at which the respective haul trucks 104 corresponding to the identifiers 214, 216, 218, 220, 222 are expected to arrive at the worksite 112. Similarly, the identifiers 224, 226 may be positioned on the user interface 200, at locations between the visual indicia 206 and the visual indicia 204, indicative of determined arrival times at which the respective haul trucks 104*f,* 104*g* corresponding to the identifiers 224, 226 are expected to arrive at the paving material plant 102. For example, FIG. 2 illustrates the identifier 222 associated with the haul truck 104*e* disposed closer to the visual indicia 206 associated with the worksite 112 than the identifier 220 associated with the haul truck 104*d*. The user interface 200 of FIG. 2 also illustrates the identifier 222 associated with the haul truck 104*e* disposed between the identifier 224 associated with the haul truck 104*f* and the identifier 220, in the direction of travel of the haul trucks. In any of the examples described herein, the positions, orientations, colors, patterns, shades, hatchings, and/or other configurations of the identifiers 214, 216, 218, 220, 222, 224, 226 (e.g., the visual indicia 212) may be dynamic, and/or may be updated in substantially real-time. For example, in some embodiments the identifiers 214, 216, 218, 220, 222, 224, 226 may be displayed in the user interface 200 as moving objects, traveling between the visual indicia 204 and the visual indicia 206, in the direction of arrow 228. In this way, the visual indicia 212 of the user interface 200 may be indicative of a plurality of haul trucks 104 traveling sequentially (e.g., in series, one after another) between the paving machine plant 102 and the worksite 112 along the travel path 114.

In any of the example embodiments described herein, the user interface 200 may comprise an interactive user interface configured to receive one or more inputs from a user via the display 202, and to provide one or more outputs via the display 202 corresponding to such inputs. In such examples, one or more of the visual indicia 204, 206, 212 described above may be configured to receive one or more inputs from a user via the display 202, and to provide various information and/or other outputs via the display 202 corresponding to such inputs. The user interface 200 may also include one or more dedicated controls configured to receive inputs via the display 202. As shown in FIG. 2, the user interface 200 may include, for example, a control 230 configured to receive an input from the user. In response to receiving such an input, the user interface 200 may provide, display, and/or otherwise output, via the display 202, various information typically associated with a paving ticket, with the paving material plant 102, with the worksite 112, and/or with various components of the paving system 100. For example, as will be described in greater detail below with respect to FIG. 3, selecting the control 230 via the display 202 may, either alone or in combination with an additional selection of one of the visual indicia 212, cause information associated with a paving material ticket (and associated with a respective one of the haul trucks 104 corresponding to the selected one of the visual indicia 212) to be displayed via the display 202.

As shown in FIG. 2, the user interface 200 may further include, for example, a control 232 configured to receive an input from the user. In response to receiving such an input, the user interface 200 may provide, display, and/or otherwise output, via the display 202, a map including visual indicia indicative of the paving material plant 102, the worksite 112, the travel path 114, one or more of the haul trucks 104, and/or various other components of the paving system 100. For example, as will be described in greater detail below with respect to FIG. 4, selecting the control 232 via the display 202 may cause at least part of such a map to be displayed via the display 202. The user interface 200 may also include various other controls 234, 236 configured to operate, access, and/or control various other features of the user interface 200 and/or various other operations of the paving system component with which the display 202 is associated.

Figure 3:
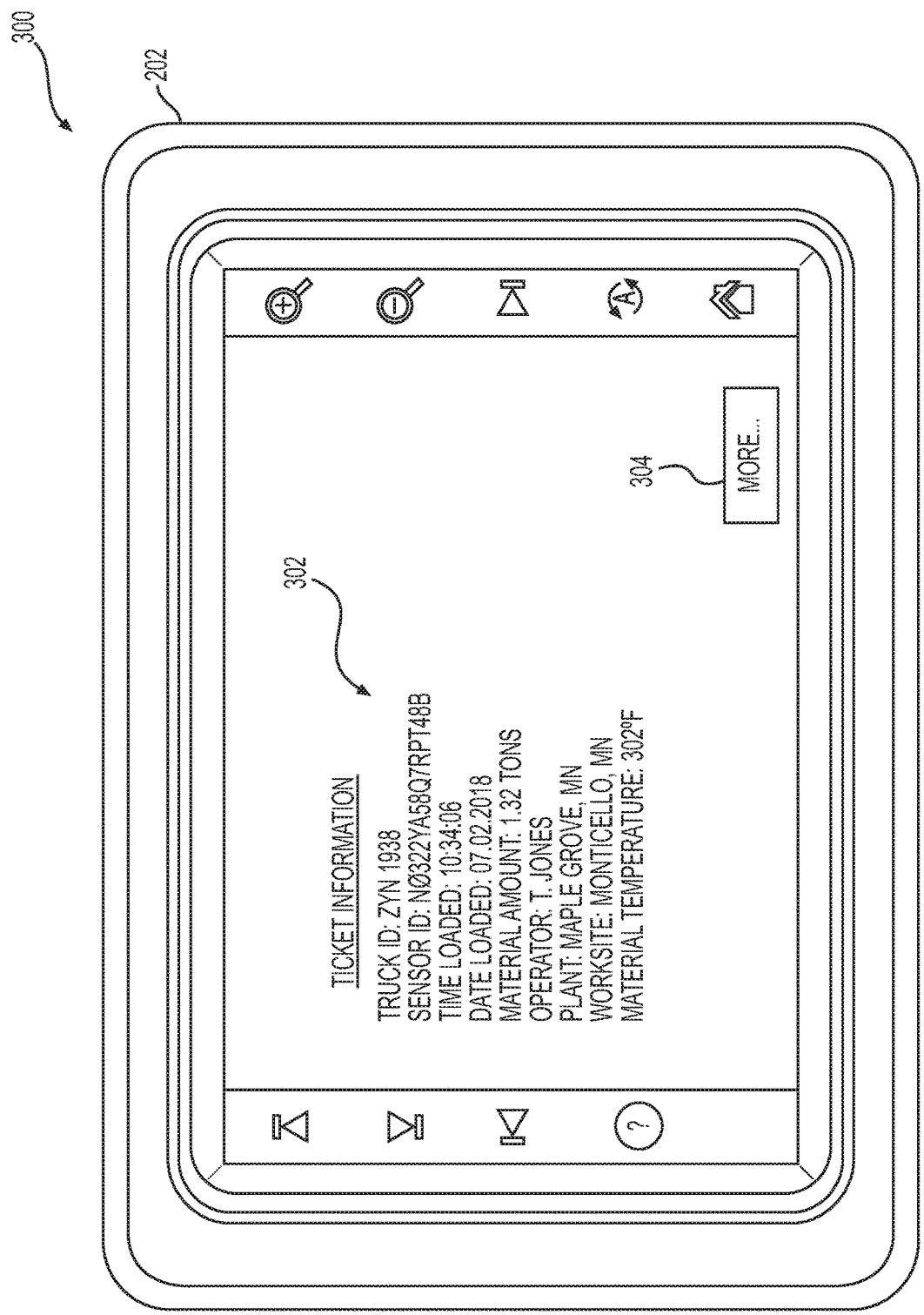
FIG. 3 is an illustration of another example user interface generated by the controller of the paving system shown in FIG. 1.

FIG. 3 illustrates another example user interface 300 of the present disclosure provided by the display 202. For example, as noted above, such a user interface 300 may be provided by the display 202 at least partly in response to receipt of an input via the control 230 (shown in FIG. 2). In some examples, such a user interface 300 may be provided by the display 202 at least partly in response to the receipt of a first input via the control 230, and at least partly in response to the receipt of a second input via one of the identifiers 214, 216, 218, 220, 222, 224, 226. In such examples, the user interface 300 may include information 302 associated with one of the haul trucks 104 corresponding to the respective one of the identifiers 214, 216, 218, 220, 222, 224, 226 via which the second input described above is received. For example, such information 302 may include, among other things, information that may be included in a paving material ticket issued by the paving material plant 102 before, during, and/or after the one of the haul trucks 104 is loaded with paving material 108. In some examples, such information 302 may include, among other things, a haul truck identifier (shown as a "Truck ID" in FIG. 3) that is unique to the one of the haul trucks 104, a location sensor identifier (shown as a "Sensor ID" in FIG. 3) that is unique to the particular location sensor 130 disposed in, connected to, and/or otherwise associated with the one of the haul trucks 104, a time at which the one of the haul trucks 104 was loaded with paving material 108 at the paving material plant 102, a date at which the one of the haul trucks 104 was loaded with paving material 108 at the paving material plant 102, an amount of paving material 108 (e.g., a weight) that was loaded into the one of the haul trucks 104 at the paving material plant 102, the name of an operator of the one of the haul trucks 104, a name, location, and/or other information indicative of the particular paving material plant 102 associated with the paving system 100, a name, location, and/or other information indicative of the worksite 112, the temperature of the paving material 108 that was loaded into the one of the haul trucks 104 at the paving material plant 102, a job identification number/identifier, and/or any additional information that may be included in a paving material ticket issued by the paving material plant 102. In some examples, the user interface 300 may also include at least one additional control 304 configured to receive an input from a user via the display 202, and to provide, for example, additional information via the display 202 in response to such an input.

Figure 4:
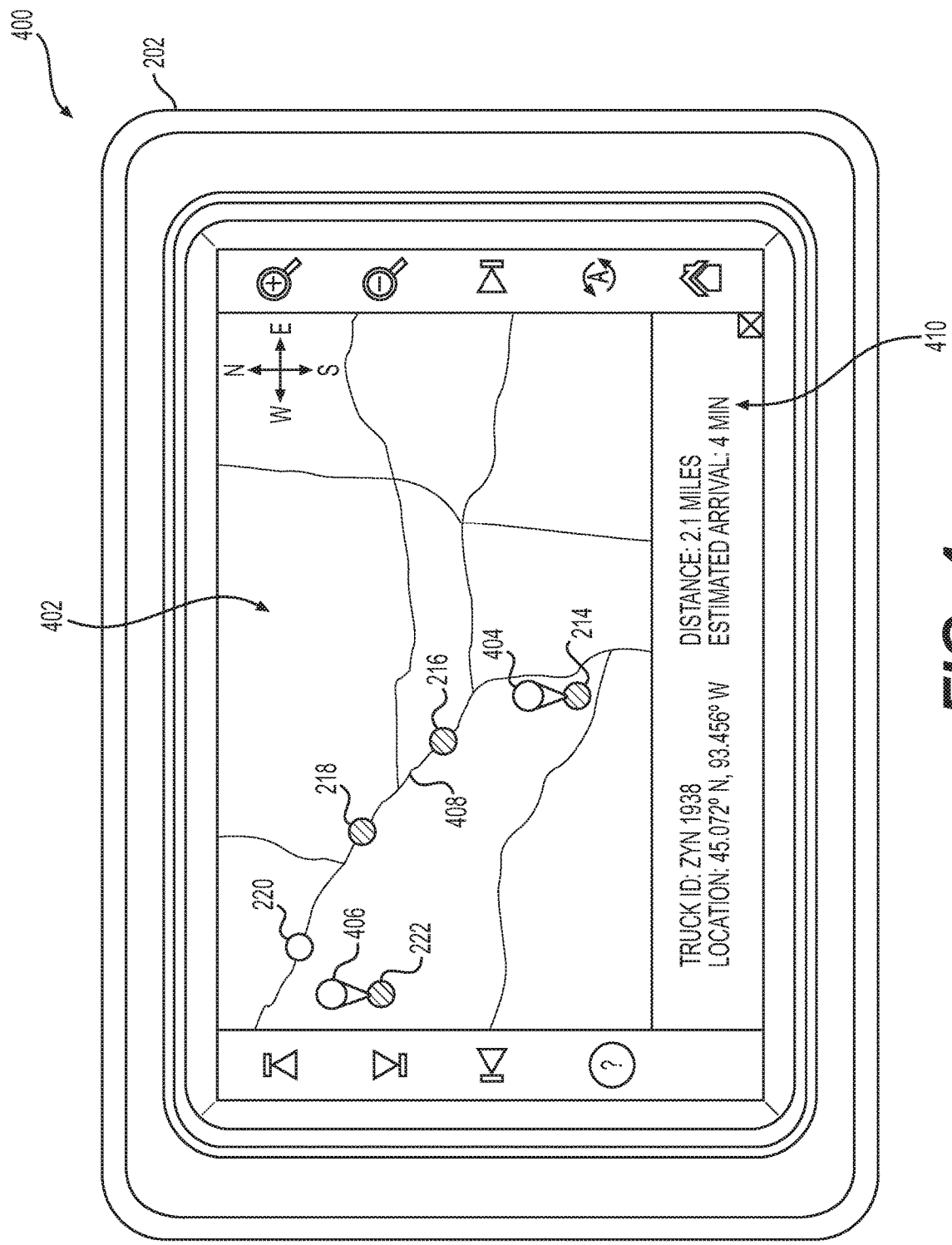
FIG. 4 is an illustration of still another example user interface generated by the controller of the paving system shown in FIG. 1.

FIG. 4 illustrates another example user interface 400 of the present disclosure provided by the display 202. For example, as noted above, such a user interface 400 may be provided by the display 202 at least partly in response to receipt of an input via the control 232 (shown in FIG. 2). Such a user interface 400 may include, for example, a map 402 illustrating at least part of an example travel path 114 extending between the paving material plant 102 and the worksite 112. In some examples, such map 402 provided by the user interface 400 may include one or more images, icons, markers, identifiers, and/or other visual indicia associated with the paving material plant 102, the worksite 112, one or more of the haul trucks 104, and/or other components of the paving system 100. For example, the map 402 provided by the user interface 400 may include a marker 404 associated with and/or otherwise indicative of the paving material plant 102, and a marker 406 associated with and/or otherwise indicative of the worksite 112. In such examples, the marker 404 indicative of the paving material plant 102 may be disposed at a location on the map 402 corresponding to the physical and/or geographic location of the paving material plant 102. Additionally, the marker 406 indicative of the worksite 112 may be disposed at a location on the map 402 corresponding to the physical and/or geographic location of the worksite 112.

In some examples, the user interface 200 may also include one or more lines, images, icons, and/or other visual indicia resembling and/or otherwise indicative of one or more of the roads 408 located proximate the worksite 112 and/or proximate the paving material plant 102. For instance, the travel path 114 extending from the paving material plant 102 to the worksite 112 may be comprised of one or more such roads 408 illustrated in the map 402. In some examples, the user interface 400 may also include one or more lines, arrows, bars, and/or other visual indicia indicative of the portion 116 of the travel path 114 extending from the paving material plant 102 to the worksite 112, the portion 118 of the travel path 114 extending from the worksite 112 to the paving material plant 102, and/or of any other portions of the travel path 114.

In some examples, the user interface 400 may also include one or more of the identifiers 214, 216, 218, 220, 222, 224, 226 described above with respect to FIG. 2. In such examples, the identifiers 214, 216, 218, 220, 222, 224, 226 included in the user interface 400 may be positioned on the map 402 at locations (e.g., along one or more of the roads 408) indicative of substantially real-time locations of the respective haul trucks 104 corresponding to the identifiers 214, 216, 218, 220, 222, 224, 226. Such substantially real-time locations of the respective haul trucks 104 may comprise, for example, locations of the respective haul trucks 104 along the travel path 114. In still further, example embodiments, the position, orientation, and/or other configurations of the identifiers 214, 216, 218, 220, 222, 224, 226 illustrated on the map 402 may be representative of, associated with, and/or otherwise indicative of the determined arrival times of the respective haul trucks 104 relative to either the worksite 112 or the paving material plant 102. In some examples, one or more of the identifiers 214, 216, 218, 220, 222, 224, 226 described above may be omitted for clarity. For example, as shown in FIG. 4, in some embodiments the user interface 400 may include the identifiers 214, 216, 218, 220, 222 corresponding to the haul trucks 104 currently traveling from the paving material plant 102 to the worksite 112 along the portion 116 of the travel path 114. In such examples, the identifiers 224, 226 corresponding to the haul trucks 104 currently traveling from the worksite 112 to the paving material plant 102 along the portion 118 of the travel path 114 may be omitted from the user interface 400.

In any of the example embodiments described herein, the user interface 400 may comprise an interactive user interface configured to receive one or more inputs from a user via the display 202, and to provide one or more outputs via the display 202 corresponding to such inputs. In such examples, one or more of the markers 404, 406, identifiers 214, 216, 218, 220, 222, 224, 226, roads 408, and/or other components of the map 402 may be configured to receive one or more inputs from a user via the display 202, and to provide various information and/or other outputs via the display 202 corresponding to such inputs. As described above with respect to the user interfaces 200, 300, the user interface 400 may also include one or more dedicated controls configured to receive inputs via the display 202.

In the example embodiment illustrated in FIG. 4, at least one of the identifiers 214, 216, 218, 220, 222 included in the user interface 400 may be configured to receive an input (e.g., a touch input) from the user. In response to receiving such an input, the user interface 400 may provide, display, and/or otherwise output, via the display 202, various information 410 associated with a respective one of the haul trucks 104 corresponding to the selected one of the identifiers 214, 216, 218, 220, 222. In some examples, such information 410 may include, among other things, the haul truck identifier (shown as a "Truck ID" in FIG. 4) that is unique to the one of the haul trucks 104, a current geographic location (e.g., GPS coordinates) of the one of the haul trucks 104, a time at which the one of the haul trucks 104 was loaded with paving material 108 at the paving material plant 102, an amount of paving material 108 (e.g., a weight of the paving material 108) that was loaded into the one of the haul trucks 104 at the paving material plant 102, a distance between the one of the haul trucks 104 and the worksite 112, information indicative of an arrival time at which the one of the haul trucks 104 is expected to arrive at the worksite 112, and/or any additional information described above with respect to, for example, FIG. 3. In some examples, such information 410 may be displayed in the user interface 400 together with the map 402, such as in a window or other portion of the user interface 400 separate from the map 402. In other examples, on the other hand, such information 410 may be displayed on the user interface 400 in place of the map 402. Additionally, while the above information 410 may be provided based at least in part on an input received via one of the identifiers 214, 216, 218, 220, 222, in further examples, additional information specific to and/or associated with the paving material plant 102 may be provided based at least in part on an input received via the marker 404. Moreover, additional information specific to and/or associated with the worksite 112 may be provided based at least in part on an input received via the marker 406.

Figure 5:
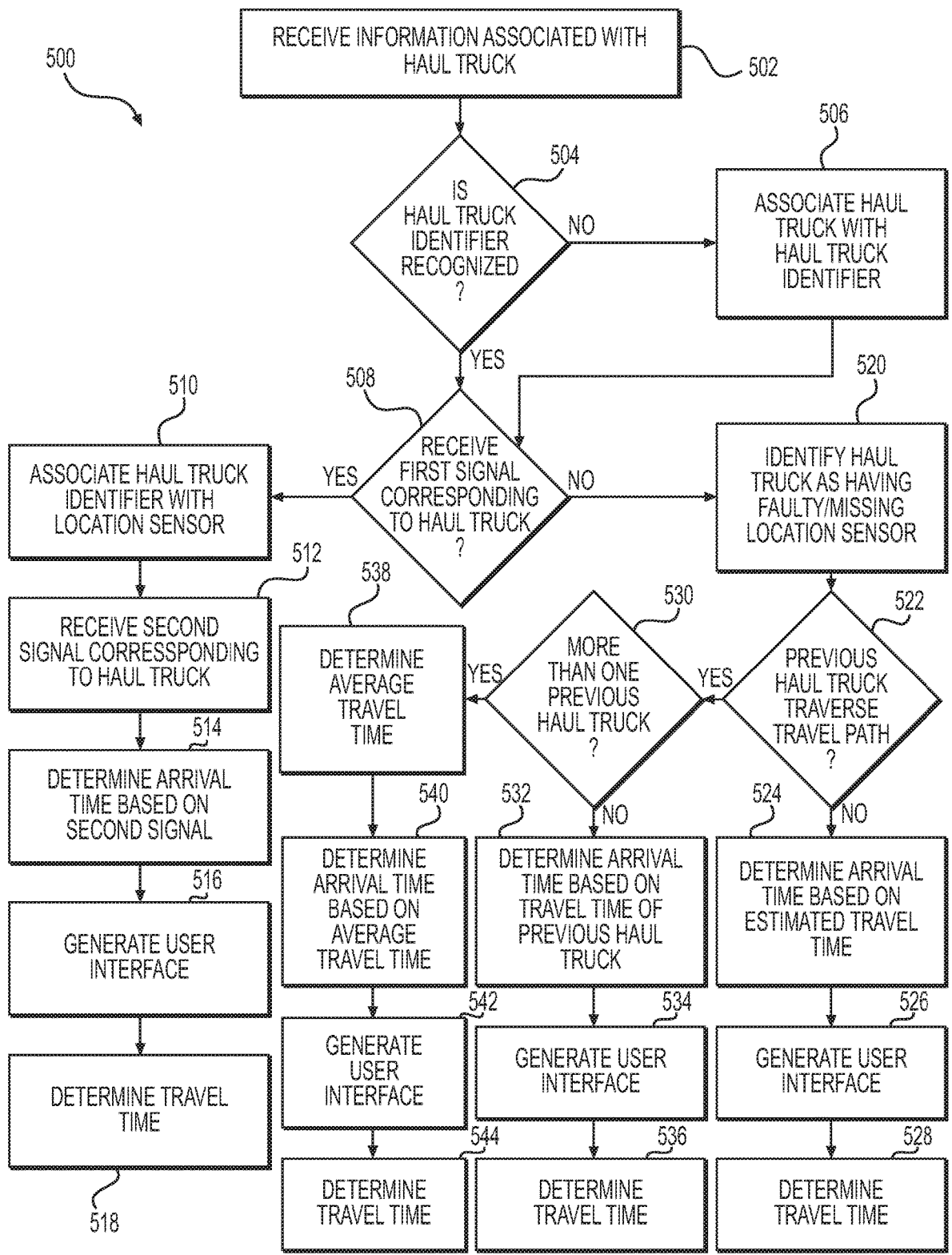
FIG. 5 is a flow chart depicting an example method of determining an arrival time of a haul truck associated with the paving system shown in FIG. 1.

FIG. 5 illustrates a flow chart depicting an example method 500 of determining an arrival time of one or more haul trucks 104. The example method 500 is illustrated as a collection of steps in a logical flow diagram, which represents operations that can be implemented in hardware, software, or a combination thereof. In the context of software, the steps represent computer-executable instructions stored in memory. When such instructions are executed by, for example, the system controller 122, such instructions may cause the system controller 122, various components of the control system 120, the paving material plant controller 144, the truck controller 154, the paving machine controller 172, and/or other components of the paving system 100 to perform the recited operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 500 is described with reference to the paving system 100, the control system 120, the paving material plant 102, and/or other items shown in FIGS. 1-4. In particular, although any part of and/or the entire method 500 may be performed by the truck controller 154, the paving machine controller 172, the paving material plant controller 144, the electronic device 128, and/or other components of the paving system 100, unless otherwise specified, the method 500 will be described below with respect to the system controller 122 for ease of description.

With reference to FIG. 5, at 502 the system controller 122 may receive information associated with one or more of the haul trucks 104 (e.g., the haul truck 104d) configured to traverse the travel path 114 extending from the paving material plant 102 to the worksite 112. The information received at 502 may include, for example, among other things, a haul truck identifier (e.g., a license plate number, a vehicle identification number, or other such number or code) that is unique to the haul truck 104d, a location sensor identifier (e.g., a numeric code, an alphanumeric code, etc.) that is unique to the particular location sensor 130 disposed in, connected to, and/or otherwise associated with the haul truck 104d, a time at which the haul truck 104d was loaded with paving material 108 at the paving material plant 102, a date at which the haul truck 104d was loaded with paving material 108 at the paving material plant 102, an amount of paving material 108 (e.g., a weight of the paving material) that was loaded into the haul truck 104d at the paving material plant 102, the name of an operator of the haul truck 104d, a name, location, and/or other information indicative of the particular paving material plant 102 associated with the paving system 100, a name, location, and/or other information indicative of the worksite 112, the temperature of the paving material 108 that was loaded into the haul truck 104d at the paving material plant 102, a job identification number/identifier, and/or any additional information that may be included in a paving material ticket issued by the paving material plant 102.

In some examples, the information received at 502 may also include environmental information associated with the haul truck 104d, the paving material plant 102, the travel path 114, and/or the worksite 112. In such examples, the environmental information may include weather information associated with the paving material plant 102, the travel path 114, and/or the worksite 112. Additionally or alternatively, the environmental information may include traffic information associated with the travel path 114. Such weather information may comprise, for example, current weather conditions associated with the travel path 114, forecasted weather conditions associated with the travel path 114, and/or previous weather conditions associated with the travel path 114 (e.g., forecasted, current, or recent rain, forecasted, current, or recent partly cloudy weather, forecasted, current, or recent sunny weather, forecasted, current, or recent temperature, forecasted, current, or recent humidity, etc.). Additionally, such traffic information may comprise current, previous, and/or forecasted traffic conditions associated with the travel path 114. In any of the examples described herein, an arrival time at which the haul truck 104d is expected to arrive at the worksite 112 may be determined by the system controller 122 based at least in part on such environmental information. For example, such weather information and/or such traffic information may be used as a weighting factor, as a constant, and/or as a modifier in one or more algorithms, lookup tables, data curves, neural networks, and/or other components of the system controller 122 configured to determine the arrival time noted above. In some examples, at least some of the information received at 502 may be entered manually by one or more operators of the paving material plant 102, one or more foreman, an operator of the haul truck 104d, and/or one or more employees associated with the paving system 102. For example, at 502 an operator of the haul truck 104d may manually enter and/or otherwise provide an estimated travel time associated with the haul truck 104d traversing the travel path 114 from the paving material plant 102 to the worksite 112. Additionally or alternatively, at least some of the information received at 502 may be received by the system controller 122 from one or more of the sensors described above.

At 504, the system controller 122 may determine whether, for example, the haul truck identifier associated with the haul truck 104d (received at 502) is included in a list of stored haul truck identifiers, and/or is otherwise recognized as being valid or accurate. For example, at 504 the system controller 122 may compare the haul truck identifier received at 502 to a plurality of haul truck identifiers stored within the memory accessible by the system controller 122 to determine whether the haul truck identifier received at 502 is included within such a list. If, at 504, the system controller 122 determines that the haul truck identifier received at 502 is not included in such a list and/or is otherwise not recognized (504—No), at 506, the system controller 122 may associate the haul truck 104d with the haul truck identifier received at 502. For example, at 506, the system controller 122 may add the haul truck identifier received at 502 to the list of haul truck identifiers described above based at least in part on determining that the haul truck identifier received at 502 is not included within the list.

Alternatively, if at 504, the system controller 122 determines that the haul truck identifier received at 502 is included in a stored list of haul truck identifiers and/or is otherwise recognized (504—Yes), at 508, the system controller 122 may determine whether one or more signals corresponding to the haul truck 104d have been received. Such signals may comprise, for example, signals generated by the location sensor 130 connected to, disposed within, and/or otherwise associated with the haul truck 104d. For example, such signals may be received by the system controller 122 via the network 124, and such signals may comprise, for example, GPS coordinates, and/or other information indicative of the location of the haul truck 104d. As noted above, functional location sensors 130 of the present disclosure may generate, emit, and/or otherwise provide such signals substantially continuously and/or at a predetermined interval.

In examples in which the system controller 122 receives one or more signals corresponding to the haul truck 104d at 508 (e.g., signals generated by the location sensor 130 associated with the haul truck 104d) (508—Yes), at 510 the system controller 122 may correlate and/or otherwise associate the haul truck identifier received at 502 with the particular location sensor 130 (e.g., with the location sensor identifier corresponding to the location sensor 130). In particular, at 510 the system controller 122 may correlate and/or otherwise associate the haul truck identifier received at 502 with the location sensor identifier (received at 502) of the location sensor 130 in a memory associated with the system controller 122.

At 512, the system controller 122 may receive one or more additional signals corresponding to the haul truck 104d. For example, at 512 the system controller 122 may receive one or more additional signals generated by the location sensor 130 associated with the haul truck 104d. As noted above with respect to 508, such signals may be received by the system controller 122 at 512 via the network 124, and such signals may comprise, for example, GPS coordinates, and/or other information indicative of the current location of the haul truck 104d. In such examples, the current location of the haul truck 104d may comprise a location of the haul truck 104d along the travel path 114.

At 514, the system controller 122 may determine an arrival time at which the haul truck 104d is expected to arrive at the worksite 112, based at least in part on one or more of the signals received at 512. For example, at 514. The system controller 122 may determine such an arrival time based at least in part on the algorithm: distance=(rate)×(time), wherein variables such as the one or speed limits associated with the travel path 114, the actual length of the travel path 114, the location of the worksite 112, and the current location of the haul truck 104d are known. Additionally or alternatively, such an arrival time may be determined by the system controller 122 at 514 based at least in part on one or more lookup tables, data curves, neural networks, and/or other components of the system controller 122 configured to determine the arrival time. In such examples, the arrival time determined at 514 may comprise an estimated time at which the haul truck 104d is expected to arrive at the worksite 112, based at least partly on a current location of the haul truck 104d along the travel path 114. Such an arrival time may also be determined and/or modified based at least in part on the environmental information received at 502.

At 516, the system controller 122 may generate a user interface configured for display on one or more of the displays described herein. For example, the user interface generated at 516 may comprise, for example, a user interface similar to the user interface 200 described with respect to FIG. 2. In such examples, the user interface generated at 516 may comprise, for example, visual indicia 204 associated with, resembling, and/or otherwise indicative of the paving material plant 102, and visual indicia 206 associated with, resembling, and/or otherwise indicative of the worksite 112. In some examples, the user interface generated at 516 may also include one or more lines, images, icons, and/or other visual indicia resembling and/or otherwise indicative of the travel path 114 extending from the paving material plant 102 and the worksite 112. Additionally, the user interface generated at 516 may include at least one section, portion, windows 208, and/or other component configured to provide information 210 indicative of an arrival time at which the haul truck 104d is expected to arrive at the worksite 112. In some examples the user interface generated at 516 may provide information 210 indicating the time remaining (hours, minutes, seconds, etc.) until the haul truck 104d is expected to arrive at the worksite 112. In other examples, the user interface generated at 516 may provide information 210 indicating the time of day at which the haul truck 104d is expected to arrive at the worksite 112.

Further, in any of the examples described herein, the user interface generated by the system controller 122 at 516 may include one or more lines, dots, images, icons, and/or other visual indicia 212 resembling and/or otherwise indicative of one or more of the haul trucks 104 associated with the paving system 100, including the haul truck 104d. For example, such visual indicia 212 may comprise any of the identifiers 214, 216, 218, 220, 222, 224, 226 described above with respect to FIG. 2.

At 518, the system controller 122 may determine the actual travel time associated with the haul truck 104d traversing the travel path 114 from the paving material plant 102 to the worksite 112. In such examples, the system controller 122 may capture, calculate, measure, sense, and/or otherwise determine such an actual travel time based at least partly on a known departure time (e.g., a time at which the haul truck 104d departs the paving material plant 102) and a known arrival time (e.g., a time at which the haul truck 104d arrives at the worksite 112). In such examples, such a known arrival time may comprise the time at which the haul truck 104d arrives at, for example, the paving machine 106 disposed at the worksite 112. In some examples, such a travel time may be determined at 518 based on, for example, timestamp information indicative of a first time at which the haul truck 104d passed through a geofence at an exit of the paving material plant 102, and a second time at which the haul truck 104d passed through a geofence at an entrance to the worksite 112.

With continued reference to FIG. 5, if at 508 the system controller 122 does not receive one or more signals corresponding to the haul truck 104d (e.g., signals generated by a location sensor 130 associated with the haul truck 104d) (508—No), at 520 the system controller 122 may identify the haul truck 104d as having a location sensor 130 that is one or missing and faulty. For example, it is understood that such location sensors 130 may send, generate, emit, and/or otherwise provide such signals substantially continuously and/or at any desired interval (e.g., every 5 seconds, every 10 seconds, every 30 seconds, every minute, every 2 minutes, every 5 minutes, etc.). Thus, if the system controller 122 does not receive one or more such signals after the system controller 122 has confirmed (e.g., based on the information received at 502) that the haul truck 104d is present at the paving material station 102, the system controller 122 may, in response, identify the haul truck 104d as having a location sensor 130 that is one of missing and faulty at 520. As will be described below, identifying the haul truck 104d in this way at 520 may cause the system controller 122 to determine, among other things, an arrival time at which the haul truck 104d is expected to arrive at the worksite 112 without the use of information received from the missing or faulty location sensor 130 of the haul truck 104d. Instead, in example embodiments the system controller 122 may determine the arrival time at which the haul truck 104d is expected to arrive at the worksite 112 using information such as the estimated arrival time received at 502, and/or one or more recorded travel times associated with one or more of the haul trucks 104 traversing the travel path 114 ahead of the haul truck 104d.

For instance, at 522 the system controller 122 may determine whether a previous haul truck (e.g., a second haul truck 104e) traversed the travel path 114 ahead of the haul truck 104d (e.g., a first haul truck 104d). In some examples, at 522 the system controller 122 may determine whether a second haul truck 104e traversed the travel path 114 ahead of the haul truck 104d based on signals received from a location sensor 130 associated with the second haul truck 104e indicating that the haul truck 104e has departed the paving material plant 102 and has arrived at the worksite 112. In such examples, such signals may also include timestamp information indicating a first time at which the haul truck 104e departed the paving material plant 102, and a second time at which the haul truck 104e arrived at the worksite. Additionally or alternatively, such signals may include timestamp information indicative of a first time at which the haul truck 104e passed through a geofence at an exit of the paving material plant 102, and a second time at which the haul truck 104e passed through a geofence at an entrance to the worksite 112. Such timestamp information may be used to determine, among other things, a travel time (e.g., an actual travel time) associated with the haul truck 104e traversing the travel path 114 ahead of the haul truck 104d.

If, at 522, the system controller 122 determines that a previous haul truck (e.g., the second haul truck 104e) did not traverse the travel path 114 ahead of the haul truck 104d (e.g., the first haul truck 104d) (522—No), at 524 the system controller 122 may determine an arrival time at which the haul truck 104d is expected to arrive at the worksite 112, and such an arrival time may be determined by the system controller 122 based at least in part on an estimated travel time associated with the haul truck 104d traversing the travel path 114. For example, at 524 the system controller 122 may determine the arrival time at which the haul truck 104d is expected to arrive at the worksite 112 based at least part on the estimated travel time received at 502. As noted above, such an estimated travel time may be received from the operator of the haul truck 104d at 502, and may comprise a length of time that the operator of the haul truck 104d expects, predicts, and/or anticipates it will take to travel from the paving material plant 102 to the worksite 112 along the travel path 114. In such examples, the operator of the haul truck 104d may provide such an estimated travel time based at least in part on weather information associated with the travel path 114, traffic information associated with the travel path 114, and/or any of the other environmental information described herein. Accordingly, the system controller 122 may determine the arrival time at 524 based at least in part on such environmental information. In any of the examples described herein, the arrival time determined by the system controller 122 at 524 may comprise the estimated travel time received at 502.

At 526, the system controller 122 may generate a user interface configured for display on one or more of the displays described herein. For example, the user interface generated at 526 may comprise, for example, a user interface similar to the user interface 200 described with respect to FIG. 2. In such examples, the user interface generated at 526 may comprise, for example, visual indicia 204 associated with, resembling, and/or otherwise indicative of the paving material plant 102, and visual indicia 206 associated with, resembling, and/or otherwise indicative of the worksite 112. In some examples, the user interface generated at 526 may also include one or more lines, images, icons, and/or other visual indicia resembling and/or otherwise indicative of the travel path 114 extending from the paving material plant 102 and the worksite 112. Additionally, the user interface generated at 526 may include at least one section, portion, windows 208, and/or other component configured to provide information 210 indicative of the arrival time determined at 524. In some examples the user interface generated at 526 may provide information 210 indicating the time remaining (hours, minutes, seconds, etc.) until the haul truck 104d is expected to arrive at the worksite 112. In other examples, the user interface generated at 526 may provide information 210 indicating the time of day at which the haul truck 104d is expected to arrive at the worksite 112. Further, in any of the examples described herein, the user interface generated by the system controller 122 at 526 may include one or more lines, dots, images, icons, and/or other visual indicia 212 resembling and/or otherwise indicative of one or more of the haul trucks 104 associated with the paving system 100, including the haul truck 104d. For example, such visual indicia 212 may comprise any of the identifiers 214, 216, 218, 220, 222, 224, 226 described above with respect to FIG. 2. In the user interface generated at 526, the identifier 220 corresponding to the haul truck 104d may be colored, patterned, shaded, hatched, and/or otherwise displayed with a configuration (e.g., shown without a hatched pattern in FIG. 2) to indicate that the haul truck 104d corresponding to the identifier 220 includes a location sensor 130 that is one of missing and faulty. Additionally, in the user interface generated at 526, the identifier 220 corresponding to the haul truck 104d may be colored, patterned, shaded, hatched, and/or otherwise configured to indicate that the haul truck 104d corresponding to the identifier 220 is loaded with paving material 108.

At 528, the system controller 122 may determine the actual travel time associated with the haul truck 104d traversing the travel path 114 from the paving material plant 102 to the worksite 112. In such examples, the system controller 122 may capture, calculate, measure, sense, and/or otherwise determine such an actual travel time based at least partly on a known departure time (e.g., a time at which the haul truck 104d departs the paving material plant 102) and a known arrival time (e.g., a time at which the haul truck 104d arrives at the worksite 112). In such examples, such a known arrival time may comprise the time at which the haul truck 104d arrives at, for example, the paving machine 106 disposed at the worksite 112. In some examples, such a travel time may be determined at 528 based on, for example, timestamp information indicative of a first time at which the haul truck 104d passed through a geofence at an exit of the paving material plant 102, and a second time at which the haul truck 104d passed through a geofence at an entrance to the worksite 112. In any of the examples described herein, the travel time determined by the system controller 122 at 528 may be stored and/or otherwise recorded in a memory associated with the system controller 122, and such a recorded travel time may be used by the system controller 122 in determining any of the arrival times described herein.

With continued reference to FIG. 5, if at 522 the system controller 122 determines that a previous haul truck (e.g., the second haul truck 104e) did traverse the travel path 114 ahead of the haul truck 104d (e.g., the first haul truck 104d) (522—Yes), at 530 the system controller 122 may determine whether more than one previous haul truck (e.g., the second haul truck 104e and at least a third haul truck 104o traversed the travel path 114 ahead of the haul truck 104d (e.g., the first haul truck 104d). In some examples, at 530 the system controller 122 may determine whether more than one previous haul truck traversed the travel path 114 ahead of the haul truck 104d based on signals received from location sensors 130 associated with the respective previous haul trucks (e.g., a location sensor 130 associated with the second haul truck 104e and/or a location sensor 130 associated with the third haul truck 104o. As noted above with respect to 522, such signals may indicate that at least one of the haul trucks 104 has departed the paving material plant 102 and has arrived at the worksite 112. In such examples, such signals may also include timestamp information indicating a first time at which at least one of the haul trucks 104 departed the paving material plant 102, and a second time at which the at least one of the haul trucks 104 arrived at the worksite 112. Additionally or alternatively, such signals may include timestamp information indicative of a first time at which the at least one of the haul trucks 104 passed through a geofence at an exit of the paving material plant 102, and a second time at which the at least one of the haul trucks 104 passed through a geofence at an entrance to the worksite 112.

If, at 530, the system controller 122 determines that more than one previous haul truck has not yet traversed the travel path 114 ahead of the haul truck 104d (530—No), at 532 the system controller 122 may determine an arrival time at which the haul truck 104d is expected to arrive at the worksite 112, and such an arrival time may be determined by the system controller 122 based at least in part on a recorded travel time associated with the single previous haul truck (e.g., haul truck 104e) traversing the travel path 114. For example, at 530 the system controller 122 may determine that a single previous haul truck (e.g., haul truck 104e) traversed the travel path 114 without an additional haul truck (e.g., haul truck 104f, haul truck 104g, etc.) traversing the travel path 114 ahead of the haul truck 104d. As noted above, such a determination may be made at 530 based at least in part on the receipt of signals from a location sensor 130 associated with the single haul truck 104e. In any of the examples described herein, the arrival time determined by the system controller 122 at 532 may comprise an actual recorded travel time of the single previous haul truck (e.g., haul truck 104e) traversing the travel path 114 ahead of the haul truck 104d. Thus, in some examples the system controller 122 may leverage stored information indicating the actual travel time of a single previous haul truck (e.g., haul truck 104e) traversing the travel path 114 ahead of the haul truck 104d to determine the arrival time at which the haul truck 104d is expected to arrive at the worksite 122. It is understood that the arrival time may also be determined by the system controller 122 at 532 based at least in part on environmental information. For example, as noted above, weather information and/or traffic information may be used as a weighting factor, as a constant, and/or as a modifier in one or more algorithms, lookup tables, data curves, neural networks, and/or other components of the system controller 122 configured to determine the arrival time at 532. For example, the system controller may modify (e.g., increase) the actual travel time of the previous haul truck (e.g., haul truck 104e) based on weather and/or traffic information received at 502 and associated with the travel path 114. Such an increase may result from one or more weighting factors, constants, and/or modifiers corresponding to such environmental information being included in one or more algorithms, lookup tables, data curves, neural networks, and/or other components of the system controller 122 configured to determine the arrival time at 532.

At 534, the system controller 122 may generate a user interface configured for display on one or more of the displays described herein. For example, the user interface generated at 534 may comprise, for example, a user interface similar to the user interface 200 described with respect to FIG. 2. In such examples, the user interface generated at 534 may comprise, for example, visual indicia 204 associated with, resembling, and/or otherwise indicative of the paving material plant 102, and visual indicia 206 associated with, resembling, and/or otherwise indicative of the worksite 112. In some examples, the user interface generated at 534 may also include one or more lines, images, icons, and/or other visual indicia resembling and/or otherwise indicative of the travel path 114 extending from the paving material plant 102 and the worksite 112. Additionally, the user interface generated at 534 may include at least one section, portion, windows 208, and/or other component configured to provide information 210 indicative of the arrival time determined at 532. In some examples the user interface generated at 534 may provide information 210 indicating the time remaining (hours, minutes, seconds, etc.) until the haul truck 104d is expected to arrive at the worksite 112. In other examples, the user interface generated at 534 may provide information 210 indicating the time of day at which the haul truck 104d is expected to arrive at the worksite 112. Further, in any of the examples described herein, the user interface generated by the system controller 122 at 534 may include one or more lines, dots, images, icons, and/or other visual indicia 212 resembling and/or otherwise indicative of one or more of the haul trucks 104 associated with the paving system 100, including the haul truck 104d. For example, such visual indicia 212 may comprise any of the identifiers 214, 216, 218, 220, 222, 224, 226 described above with respect to FIG. 2. In the user interface generated at 534, the identifier 220 corresponding to the haul truck 104d may be colored, patterned, shaded, hatched, and/or otherwise displayed with a configuration (e.g., shown without a hatched pattern in FIG. 2) to indicate that the haul truck 104d corresponding to the identifier 220 includes a location sensor 130 that is one of missing and faulty. Additionally, in the user interface generated at 534, the identifier 220 corresponding to the haul truck 104d may be colored, patterned, shaded, hatched, and/or otherwise configured to indicate that the haul truck 104d corresponding to the identifier 220 is loaded with paving material 108. Further, in an example user interface generated at 534, the identifier 222 corresponding to the second haul truck 104e may be configured as described above with respect to FIG. 2, and the identifiers 224, 226 (corresponding to the haul trucks 104f, 104g, respectively) may be omitted.

At 536, the system controller 122 may determine the actual travel time associated with the haul truck 104d traversing the travel path 114 from the paving material plant 102 to the worksite 112. In such examples, the system controller 122 may capture, calculate, measure, sense, and/or otherwise determine such an actual travel time based at least partly on a known departure time (e.g., a time at which the haul truck 104d departs the paving material plant 102) and a known arrival time (e.g., a time at which the haul truck 104d arrives at the worksite 112). In such examples, such a known arrival time may comprise the time at which the haul truck 104d arrives at, for example, the paving machine 106 disposed at the worksite 112. In some examples, the system controller 122 may determine such a travel time at 536 in ways that are similar to and/or that are the same as those described above with respect to 528. In any of the examples described herein, the travel time determined by the system controller 122 at 536 may be stored and/or otherwise recorded in a memory associated with the system controller 122, and such a recorded travel time may be used by the system controller 122 in determining any of the arrival times described herein.

With continued reference to FIG. 5, if at 530, the system controller 122 determines that more than one previous haul truck has traversed the travel path 114 ahead of the haul truck 104d (530—Yes), at 538 the system controller 122 may determine an average travel time associated with and/or otherwise based at least in part on recorded travel times of two or more of the previous haul trucks 104. For example, at 530 the system controller 122 may determine that multiple haul trucks (e.g., a plurality of haul trucks 104 including haul truck 104e and haul truck 104o traversed the travel path 114 ahead of the haul truck 104d. In some examples, at 530 the system controller 122 may determine that more than one previous haul truck (e.g., a plurality of previous haul trucks) traversed the travel path 114 ahead of the haul truck 104d based on signals received from location sensors 130 associated with the respective previous haul trucks (e.g., a location sensor 130 associated with the haul truck 104e and a location sensor 130 associated with the haul truck 104ƒ. As noted above with respect to 522, such signals may indicate that multiple previous haul trucks 104 have departed the paving material plant 102 and have arrived at the worksite 112. In such examples, such signals may also include respective timestamp information indicating first times at which the respective haul trucks 104 departed the paving material plant 102, and second times at which the respective haul trucks 104 arrived at the worksite 112. Additionally or alternatively, such signals may include timestamp information indicative of first times at which the respective haul trucks 104 passed through a geofence at an exit of the paving material plant 102, and second times at which the respective haul trucks 104 passed through a geofence at an entrance to the worksite 112. In any of the examples above, at 538 the system controller 122 may calculate and/or otherwise determine an average (e.g., a rolling average) of the recorded travel times associated with the previous haul trucks 104 (e.g., respective travel times of the haul truck 104e and haul truck 104ƒ traversing the travel path 114 from the paving material plant 102 to the worksite 112.

At 540, the system controller 122 may determine an arrival time at which the haul truck 104d is expected to arrive at the worksite 112, and such an arrival time may be determined by the system controller 122 based at least in part on the recorded travel time associated with the previous haul truck 104e traversing the travel path 114 and based at least in part on the recorded travel time associated with the previous haul truck 104ƒ traversing the travel path 114. In any of the examples described herein, the arrival time determined by the system controller 122 at 540 may comprise the average travel time determined at 538. Thus, in some examples the system controller 122 may leverage stored information indicating the actual travel time of multiple haul trucks 104 (e.g., previous haul truck 104e and previous haul truck 104ƒ traversing the travel path 114 ahead of the haul truck 104d to determine the arrival time at which the haul truck 104d is expected to arrive at the worksite 122. It is understood that the arrival time may also be determined by the system controller 122 at 540 based at least in part on environmental information. For example, as noted above, weather information and/or traffic information may be used as a weighting factor, as a constant, and/or as a modifier in one or more algorithms, lookup tables, data curves, neural networks, and/or other components of the system controller 122 configured to determine the arrival time at 540. The use of such environmental information in determining the arrival time at 540 may be similar to the processes described above with respect to 532.

At 542, the system controller 122 may generate a user interface configured for display on one or more of the displays described herein. For example, the user interface generated at 542 may comprise, for example, a user interface similar to the user interface 200 described with respect to FIG. 2. In such examples, the user interface generated at 542 may comprise, for example, visual indicia 204 associated with, resembling, and/or otherwise indicative of the paving material plant 102, and visual indicia 206 associated with, resembling, and/or otherwise indicative of the worksite 112. In some examples, the user interface generated at 542 may also include one or more lines, images, icons, and/or other visual indicia resembling and/or otherwise indicative of the travel path 114 extending from the paving material plant 102 and the worksite 112. Additionally, the user interface generated at 542 may include at least one section, portion, windows 208, and/or other component configured to provide information 210 indicative of the arrival time determined at 540. In some examples the user interface generated at 542 may provide information 210 indicating the time remaining (hours, minutes, seconds, etc.) until the haul truck 104d is expected to arrive at the worksite 112. In other examples, the user interface generated at 542 may provide information 210 indicating the time of day at which the haul truck 104d is expected to arrive at the worksite 112. Further, in any of the examples described herein, the user interface generated by the system controller 122 at 542 may include one or more lines, dots, images, icons, and/or other visual indicia 212 resembling and/or otherwise indicative of one or more of the haul trucks 104 associated with the paving system 100, including the haul truck 104d. For example, such visual indicia 212 may comprise any of the identifiers 214, 216, 218, 220, 222, 224, 226 described above with respect to FIG. 2. In the user interface generated at 542, the identifier 220 corresponding to the haul truck 104d may be colored, patterned, shaded, hatched, and/or otherwise displayed with a configuration (e.g., shown without a hatched pattern in FIG. 2) to indicate that the haul truck 104d corresponding to the identifier 220 includes a location sensor 130 that is one of missing and faulty. Additionally, in the user interface generated at 542, the identifier 220 corresponding to the haul truck 104d may be colored, patterned, shaded, hatched, and/or otherwise configured to indicate that the haul truck 104d corresponding to the identifier 220 is loaded with paving material 108. Further, in an example user interface generated at 534, the identifiers 222, 224, 226 (corresponding to the haul trucks 104e, 104ƒ, 104g, respectively) may be configured as described above with respect to FIG. 2.

At 544, the system controller 122 may determine the actual travel time associated with the haul truck 104d traversing the travel path 114 from the paving material plant 102 to the worksite 112. In such examples, the system controller 122 may capture, calculate, measure, sense, and/or otherwise determine such an actual travel time based at least partly on a known departure time (e.g., a time at which the haul truck 104d departs the paving material plant 102) and a known arrival time (e.g., a time at which the haul truck 104d arrives at the worksite 112). In such examples, such a known arrival time may comprise the time at which the haul truck 104d arrives at, for example, the paving machine 106 disposed at the worksite 112. In some examples, the system controller 122 may determine such a travel time at 536 in ways that are similar to and/or that are the same as those described above with respect to 528. In any of the examples described herein, the travel time determined by the system controller 122 at 544 may be stored and/or otherwise recorded in a memory associated with the system controller 122, and such a recorded travel time may be used by the system controller 122 in determining any of the arrival times described herein. Also, in any of the examples described herein, the arrival times determined at 514, 524, 532, and/or 540 may be provided to the paving machine 106, the electronic device 128, and/or other components of the paving system 100 via the network 124, and such information may be used by the components of the paving system 100 and/or by operators thereof to modify and/or otherwise control the operation of such components.

INDUSTRIAL APPLICABILITY

The present disclosure describes systems and methods for estimating, calculating, and/or otherwise determining an arrival time at which a haul truck 104d having a missing or faulty location sensor 130 is expected to arrive at a worksite 112. Such systems and methods may be used to more efficiently coordinate activities of one or more haul trucks 104, paving machines 106, compaction machines, and/or other machines or equipment of a paving system 100 during paving operations. For example, such systems and methods may enable a system controller 122 of a control system 120 to determine the delivery rate of paving material 108 being delivered to the worksite 112 by a series of haul trucks 104 traversing the same travel path 114, even in situations where one or more of the haul trucks 104 has a location sensor that is one of missing and faulty. In such examples, the system controller 122 may provide information indicative of the determined arrival time to a paving machine controller 172. For example, the system controller 122 may generate a user interface 200 that includes such information, and may provide the user interface 200 to the paving machine controller 172 for display on a display 168 of the paving machine 106. As a result, an operator of the paving machine 106 may control the speed and/or paving rate of the paving machine 106 based at least in part on the determined arrival time, and the efficiency of the paving system 100 may be improved.

As noted above with respect to FIGS. 1-5, an example method 500 of determining an arrival time at which a haul truck 104d is expected to arrive at a worksite 112 may include receiving information associated with the haul truck 104d, such as a haul truck identifier that is unique to the haul truck 104d. Such a method 500 may also include identifying the haul truck 104d as having a location sensor 130 that is one of missing and faulty. In some examples, a system controller 122 may identify the haul truck 104d in this way by determining, without receiving a signal from the location sensor 130 of the haul truck 104d while the haul truck 104d is disposed at a paving material plant 102, that the haul truck 104d is disposed at the paving material plant 102. Such an example method 500 may also include determining whether an additional haul truck (e.g., the haul truck 104e) traversed the travel path 114 ahead of the haul truck 104d, and determining the arrival time based at least in part on such a determination. In such examples, the system controller 122 may determine the arrival time based at least in part on an estimated travel time associated with the haul truck 104d traversing the travel path 114, or a recorded travel time associated with at least one additional haul truck (e.g., the haul truck 104e) traversing the travel path 114 ahead of the haul truck 104d.

As noted above, the system controller 122 may also generate a user interface 200 that includes information indicative of the determined arrival time of the haul truck 104d, and may provide the user interface 200 to the paving machine controller 172 for display. As a result, an operator of the paving machine 106 may increase or decrease the travel speed and/or paving speed of the paving machine 106 based on such information, and operating the paving machine 106 in this way may maximize efficiency at a paving worksite 112. For example, regulating the speed and/or paving rate of the paving machine 106 in accordance with the arrival time of the haul truck 104d may minimize and/or substantially eliminate paving machine stoppages during the paving process, thereby improving the consistency and quality of the resulting mat of paving material 108.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method, comprising:
receiving, with a controller, information associated with a first haul truck configured to traverse a travel path extending from a paving material plant to a worksite, the information including a haul truck identifier unique to the first haul truck;
identifying, with the controller, the first haul truck as having a location sensor that is one of not disposed on the first haul truck and faulty;
determining, with the controller, whether a second haul truck traversed the travel path ahead of the first haul truck; and
based at least in part on determining whether the second haul truck traversed the travel path ahead of the first haul truck, determining, with the controller, an arrival time at which the first haul truck is expected to arrive at the worksite, wherein the arrival time is determined based at least in part on
an estimated travel time associated with the first haul truck traversing the travel path, or
a recorded travel time associated with the second haul truck traversing the travel path ahead of the first haul truck.

2. The method of claim 1, wherein the information associated with the first haul truck further includes at least one of a time at which the first haul truck was loaded with paving material at the paving material plant, a temperature of the paving material, an amount of the paving material, a location of the worksite, and the estimated travel time.

3. The method of claim 1, further comprising:
determining that the haul truck identifier is not included in a list of stored haul truck identifiers; and
adding the haul truck identifier to the list based at least in part on determining that the haul truck identifier is not included in the list.

4. The method of claim 1, wherein identifying the first haul truck as having the location sensor that is the one of not disposed on the first haul truck and faulty includes determining, without receiving a signal from the location sensor while the first haul truck is disposed at the paving material plant, that the first haul truck is disposed at the paving material plant.

5. The method of claim 1, wherein:
determining whether the second haul truck traversed the travel path ahead of the first haul truck includes determining that the second haul truck did not traverse the travel path ahead of the first haul truck; and
the arrival time is determined based at least in part on the estimated travel time.

6. The method of claim 1, wherein:
determining whether the second haul truck traversed the travel path ahead of the first haul truck includes determining that the second haul truck traversed the travel path ahead of the first haul truck, and without a third haul truck traversing the travel path ahead of the first haul truck; and the arrival time is determined based at least in part on the recorded travel time.

7. The method of claim 1, wherein:
determining whether the second haul truck traversed the travel path ahead of the first haul truck includes:
determining that the second haul truck traversed the travel path ahead of the first haul truck, and
determining that a third haul truck traversed the travel path ahead of the first haul truck; and
the arrival time is determined based at least in part on the recorded travel time associated with the second haul truck and a recorded travel time associated with the third haul truck traversing the travel path.

8. The method of claim 1, wherein the controller identifies the first haul truck as having the location sensor that is one of not disposed on the first haul truck and faulty based at least in part on information confirming that the first haul truck is disposed at the paving material plant.

9. The method of claim 7, further comprising generating a user interface, the user interface including first visual indicia of the paving material plant, second visual indicia of the worksite, a first identifier associated with the first haul truck, a second identifier associated with the second haul truck, a third identifier associated with the third haul truck, and information indicative of the arrival time, wherein on the user interface,
the second identifier is disposed closer to the second visual indicia than the first identifier, and
the second identifier is disposed between the third identifier and the first identifier.

10. The method of claim 9,
wherein the controller determines whether the second haul truck traversed the travel path ahead of the first haul truck based at least in part on identifying the first haul truck as having the location sensor that is one of not disposed on the first haul truck and faulty.

11. The method of claim 1, further comprising receiving environmental information including at least one of weather information associated with the travel path, and traffic information associated with the travel path, wherein the arrival time is determined based at least in part on the environmental information.

12. A paving system, comprising:
a first haul truck configured to traverse a travel path extending from a paving material plant to a worksite;
a second haul truck configured to traverse the travel path;
a first location sensor configured to determine a location of the second haul truck along the travel path; and
a system controller in communication with the first location sensor via a network, the system controller being configured to:
identify the first haul truck as having a second location sensor that is one of not disposed on the first haul truck and faulty,
determine, based at least in part on a signal received from the first location sensor via the network, that the second haul truck traversed the travel path ahead of the first haul truck, and
determine an arrival time at which the first haul truck is expected to arrive at the worksite, wherein the arrival time is determined based at least in part on a recorded travel time associated with the second haul truck traversing the travel path ahead of the first haul truck.

13. The paving system of claim 12, wherein the system controller is further configured to:
receive a haul truck identifier unique to the first haul truck;
determine that the haul truck identifier is not included in a list of stored haul truck identifiers; and
add the haul truck identifier to the list based at least in part on determining that the haul truck identifier is not included in the list.

14. The paving system of claim 12, wherein the system controller is further configured to determine, without receiving a signal from the second location sensor while the first haul truck is disposed at the paving material plant, that the first haul truck is disposed at the paving material plant.

15. The paving system of claim 12, wherein the system controller is further configured to:
determine that a third haul truck traversed the travel path ahead of the first haul truck;
determine an average travel time based at least in part on the recorded travel time associated with the second haul truck traversing the travel path and an additional recorded travel time associated with the third haul truck traversing the travel path ahead of the first haul truck; and
determine the arrival time based at least in part on the average travel time.

16. The paving system of claim 15, wherein the system controller is further configured to:
generate a user interface, the user interface including a first identifier associated with the first haul truck, a second identifier associated with the second haul truck, a third identifier associated with the third haul truck, and information indicative of the arrival time; and
provide the user interface to at least one of an electronic device and a paving machine controller via the network.

17. A control system, comprising:
a first location sensor;
a system controller; and
a network configured to transmit signals between the first location sensor and the system controller, wherein the system controller is configured to:
identify a first haul truck as having a second location sensor that is one of decoupled from the first haul truck and faulty,
receive a signal from the first location sensor via the network,
determine, based at least in part on the signal, that the second haul truck traversed a travel path ahead of the first haul truck, the travel path extending from a paving material plant to a worksite, and
determine an arrival time at which the first haul truck is expected to arrive at the worksite, wherein the arrival time is determined based at least in part on a recorded travel time associated with the second haul truck traversing the travel path ahead of the first haul truck.

18. The control system of claim 17, wherein identifying the first haul truck as having the second location sensor that is the one of decoupled from the first haul truck and faulty comprises determining, without receiving a signal from the second location sensor while the first haul truck is disposed at the paving material plant, that the first haul truck is disposed at the paving material plant.

19. The control system of claim 17, wherein the system controller is further configured to:

determine that a plurality of haul trucks traversed the travel path ahead of the first haul truck;

determine an average travel time based at least in part on the recorded travel time associated with the second haul truck traversing the travel path and additional recorded travel times associated with respective haul trucks of the plurality of haul trucks traversing the travel path ahead of the first haul truck; and determine the arrival time based at least in part on the average travel time.

20. The control system of claim 19, wherein the system controller is further configured to:

generate a user interface, the user interface including a first identifier associated with the first haul truck, and information indicative of the arrival time; and provide the user interface to at least one of an electronic device and a paving machine controller via the network.

* * * * *